(12) United States Patent
Hashimoto et al.

(10) Patent No.: US 9,883,303 B2
(45) Date of Patent: Jan. 30, 2018

(54) SOUND FIELD MEASURING DEVICE, METHOD AND PROGRAM

(71) Applicant: CLARION CO., LTD., Saitama-shi (JP)

(72) Inventors: Takeshi Hashimoto, Motomiya (JP); Kazutomo Fukue, Saitama (JP); Tetsuo Watanabe, Hasuda (JP); Yasuhiro Fujita, Kashiwa (JP)

(73) Assignee: CLARION CO., LTD., Saitama-Shi (JP)

( * ) Notice: Subject to any disclaimer, the term of this patent is extended or adjusted under 35 U.S.C. 154(b) by 82 days.

(21) Appl. No.: 14/916,567

(22) PCT Filed: Sep. 19, 2014

(86) PCT No.: PCT/JP2014/074848
§ 371 (c)(1),
(2) Date: Mar. 4, 2016

(87) PCT Pub. No.: WO2015/050006
PCT Pub. Date: Apr. 9, 2015

(65) Prior Publication Data
US 2016/0219385 A1 Jul. 28, 2016

(30) Foreign Application Priority Data

Oct. 1, 2013 (JP) ................................. 2013-206163

(51) Int. Cl.
*H04R 29/00* (2006.01)
*G10L 21/14* (2013.01)
(Continued)

(52) U.S. Cl.
CPC ............ *H04R 29/001* (2013.01); *G10L 21/14* (2013.01); *G10L 21/18* (2013.01); *G01H 3/125* (2013.01);
(Continued)

(58) Field of Classification Search
CPC combination set(s) only.
See application file for complete search history.

(56) References Cited

U.S. PATENT DOCUMENTS

2005/0013442 A1* 1/2005 Ohta ..................... H04S 7/30
381/1
2005/0195984 A1 9/2005 Miura et al.
(Continued)

FOREIGN PATENT DOCUMENTS

CN 1664921 9/2005
JP 07-075190 3/1995
(Continued)

OTHER PUBLICATIONS

Chinese Office Action for corresponding CN Application No. 201480053267.5, Nov. 23, 2016 (w/ English machine translation).
(Continued)

*Primary Examiner* — Duc Nguyen
*Assistant Examiner* — Assad Mohammed
(74) *Attorney, Agent, or Firm* — Mori & Ward, LLP

(57) ABSTRACT

A sound field measuring device (1) obtains frequency characteristics by collecting output sound outputted from a pair of speakers (101*a*, 101*b*) installed at a narrow interval. A low-pass filter (22*a*) extracts low-range components of a first measurement signal. A high-pass filter (22*b*) extracts mid/high-range components of a second measurement signal different from the first measurement signal. A combined signal generation unit (22*c*) generates a combined signal by combining the low-range components of the first measurement signal and the mid/high-range components of the second measurement signal. An external output unit (6) outputs the first measurement signal to an audio system (102). A microphone (7) collects the first measurement signal and the combined signal simultaneously outputted from the pair of speakers. A Fourier transform unit (13)
(Continued)

obtains the frequency characteristics of a sound field by Fourier transforming the signals collected.

6 Claims, 14 Drawing Sheets

(51) Int. Cl.
    *G10L 21/18*     (2013.01)
    *G01H 3/12*     (2006.01)
    *H04S 1/00*     (2006.01)

(52) U.S. Cl.
    CPC .............. *H04R 29/008* (2013.01); *H04S 1/00* (2013.01); *H04S 2400/15* (2013.01)

(56) References Cited

U.S. PATENT DOCUMENTS

| | | | |
|---|---|---|---|
| 2007/0147636 A1* | 6/2007 | Oteki | H04S 7/302 381/96 |
| 2010/0260356 A1 | 10/2010 | Teramoto et al. | |
| 2011/0051954 A1* | 3/2011 | Thomsen | H03F 3/34 381/93 |
| 2011/0058684 A1* | 3/2011 | Ohta | H04S 1/00 381/97 |
| 2011/0251704 A1 | 10/2011 | Walsh et al. | |
| 2012/0283581 A1* | 11/2012 | Olde | A61B 5/02 600/485 |

FOREIGN PATENT DOCUMENTS

| | | |
|---|---|---|
| JP | 2006-262015 | 9/2006 |
| JP | 2007-232492 | 9/2007 |
| JP | 2008-177795 | 7/2008 |
| JP | 2013-527491 | 6/2013 |
| WO | WO 2009/008068 | 1/2009 |
| WO | WO 2009/095965 | 8/2009 |

OTHER PUBLICATIONS

International Search Report for corresponding International Application No. PCT/JP2014/074848, dated Dec. 2, 2014.

\* cited by examiner

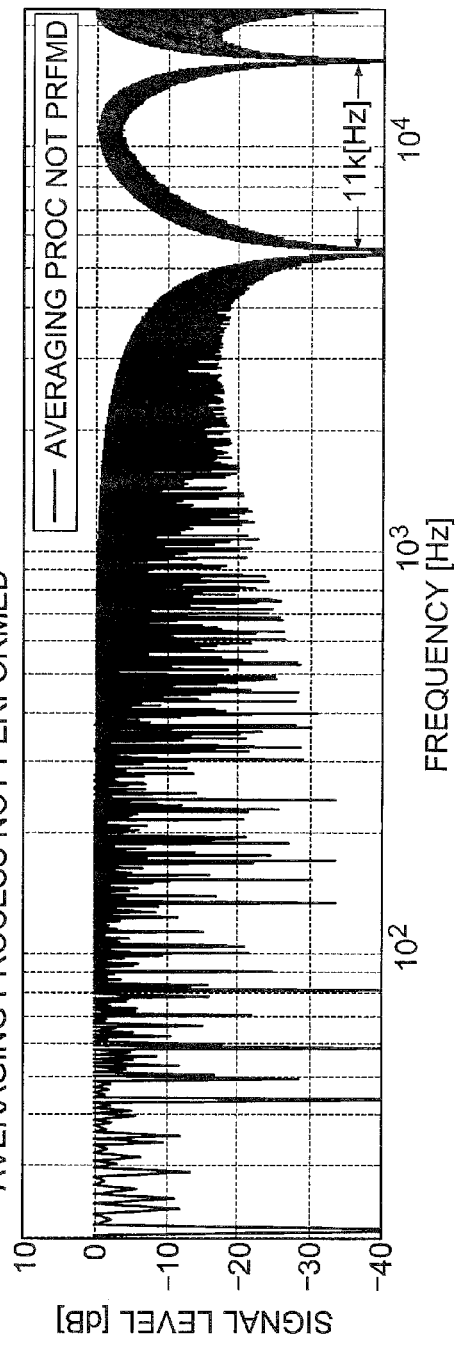
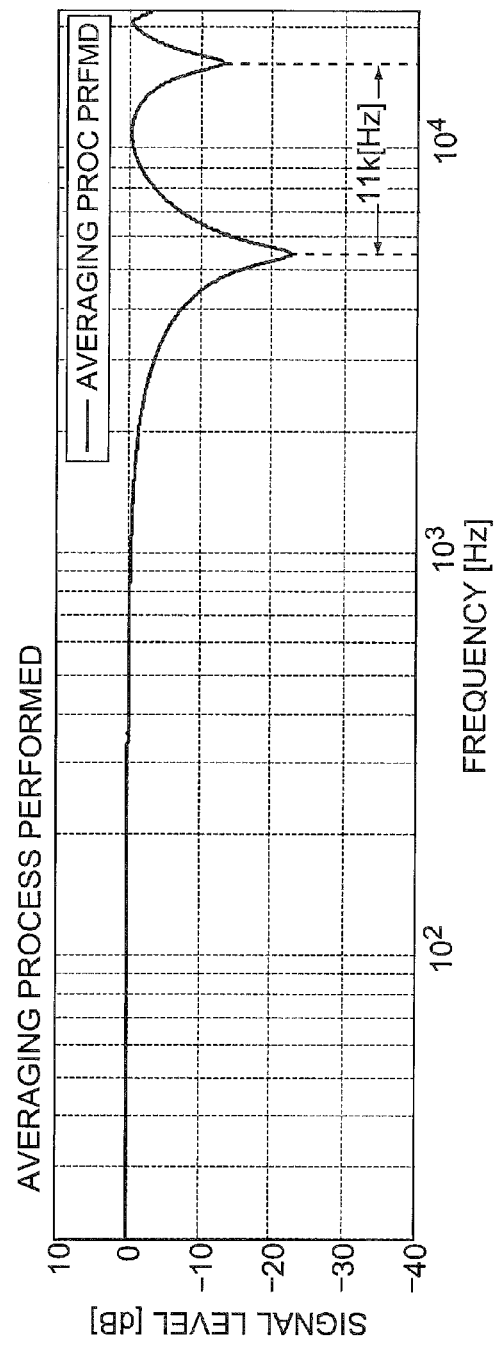
FIG. 7(a)
FIG. 7(b)

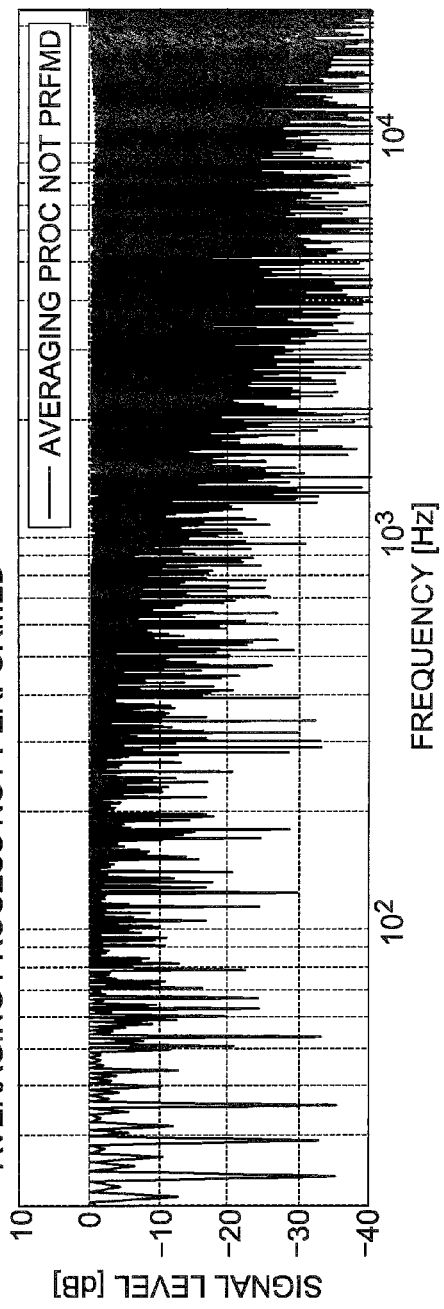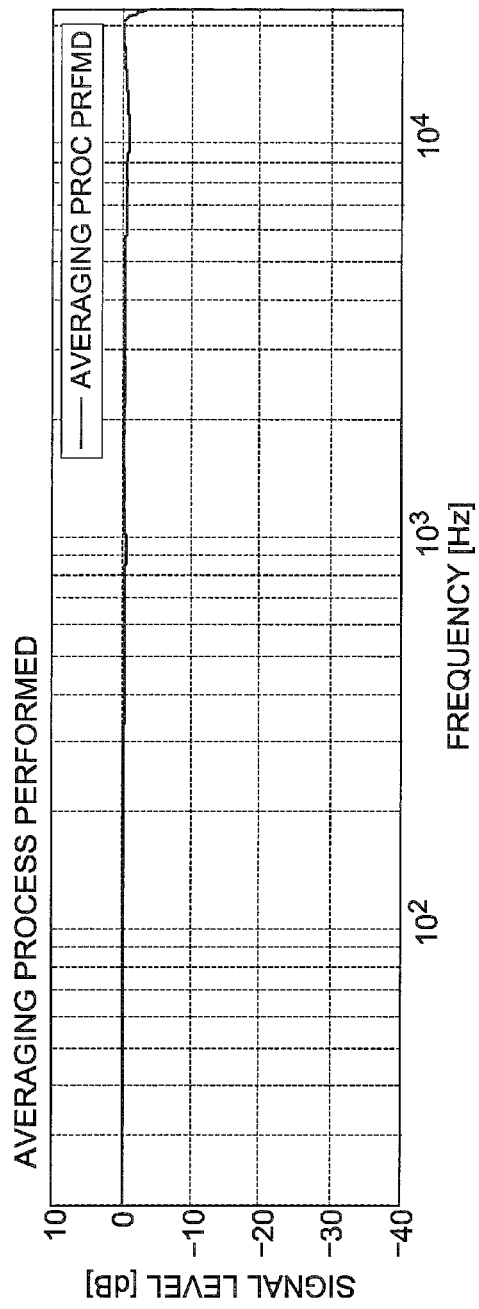
FIG. 9(a)
FIG. 9(b)

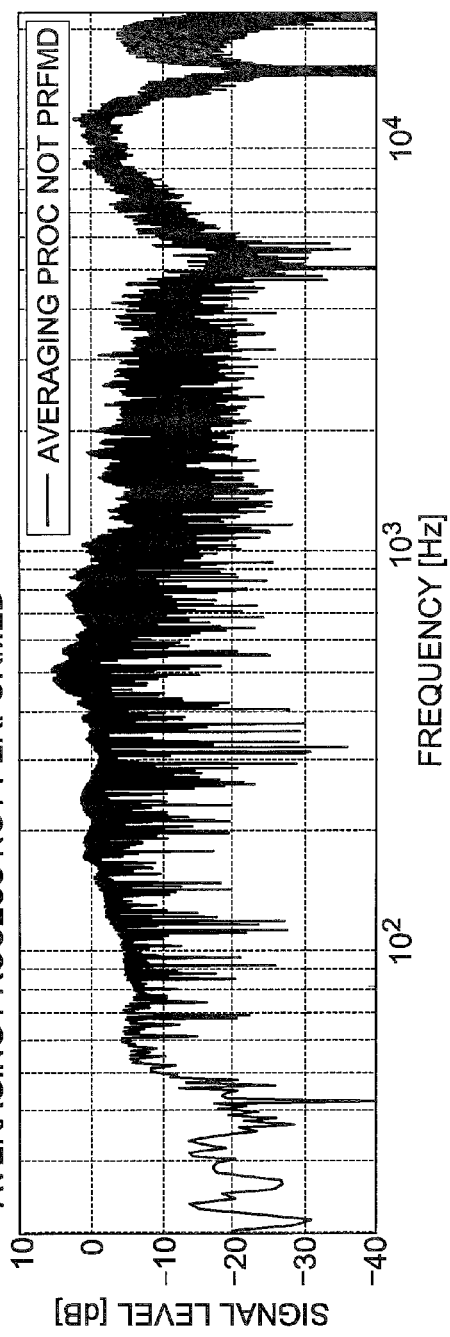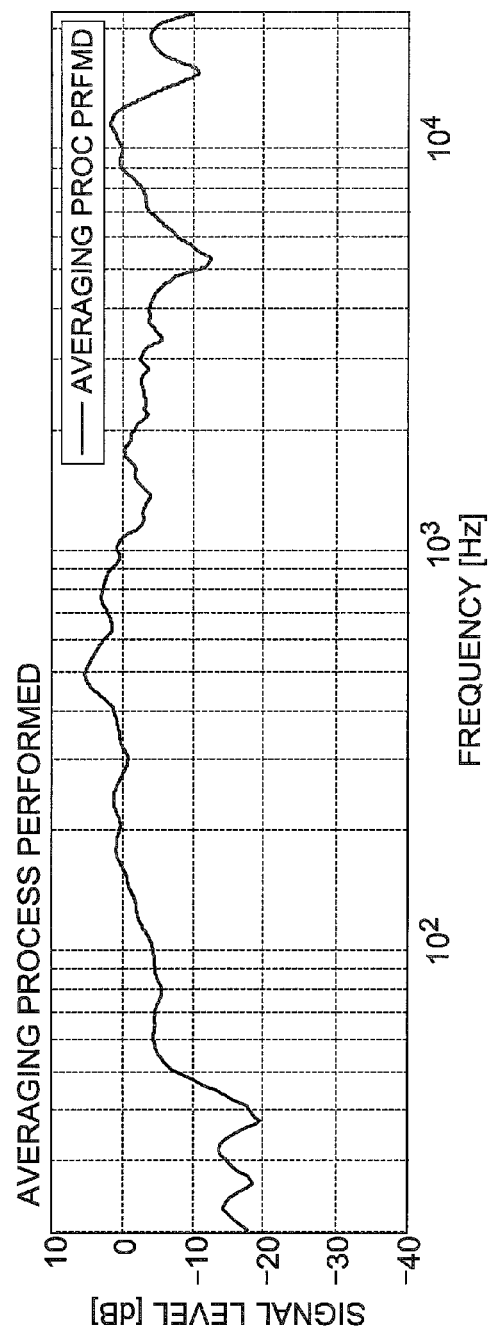
FIG. 10(a)
FIG. 10(b)

SOUND FIELD MEASURING DEVICE, METHOD AND PROGRAM

TECHNICAL FIELD

The present invention relates to a sound field measuring device, method, and program. More specifically, the invention relates to a sound field measuring device, method, and program that can measure frequency characteristics quickly and accurately in a sound field environment in which a pair of speakers are installed at a narrow interval.

BACKGROUND ART

There has been known a method of providing music having sound quality most suitable for a sound field environment in which speakers or the like of an audio system are installed, by measuring frequency characteristics in the sound field environment and adjusting the equalizer of the audio system on the basis of the measured frequency characteristics or by previously correcting output sound in accordance with the sound field.

A maximum-length sequence (m-sequence) code and a time-stretched pulse (TSP) signal are known as measurement signals for measuring frequency characteristics. Examples of a method for measuring the frequency characteristics of the sound field environment using such a measurement signal include a method including recording a measurement signal outputted from a speaker using a microphone installed in the listening position and then Fourier transforming the recorded signal to obtain the frequency characteristics (for example, see Patent Literatures 1, 2). An impulse response may be obtained by obtaining cross-correlation characteristics between an outputted measurement signal and a measurement signal recorded using a microphone while using the outputted measurement signal as a reference.

CITATION LIST

Patent Literature

PTL 1: Japanese Unexamined Patent Application Publication No. 07-075190
PTL 2: Japanese Unexamined Patent Application Publication No. 2007-232492

SUMMARY OF INVENTION

Technical Problem

The frequency characteristics of the sound field environment vary with the listening position relative to speakers. The measured accuracy of the frequency characteristics tends to vary with the interval between installed speakers, or the like. For example, imagine a portable audio system 102, as shown in FIG. 14, in which a music playback function unit 100 and a pair of a right speaker 101a and a left speaker 101b on the right and left sides thereof are integral with each other. In such a portable audio system, the right and left speakers 101a, 101b tend to be installed at a narrow interval. Further, the main body of the system tends to be placed close to the listener due to the portability thereof or the like and thus the distance between the portable audio system 102 and listener tends to be short.

For example, as shown in FIG. 14, the same m-sequence codes serving as measurement signals are simultaneously outputted from the right speaker 101a and left speaker 101b. Then, the frequency characteristics between the right and left speakers 101a, 101b and the microphone 7 are measured. Since the right and left speakers 101a, 101b are installed at a narrow interval and are close to the microphone 7, the delay time difference between the channels (the signal transmission paths from the respective speakers to the microphone 7) tends to be small. When the delay time difference between the channels is small, inter-channel interference tends to occur and thus large dips tend to occur at particular frequencies. The position of such a dip significantly varies with the delay time difference. Accordingly, disadvantageously, the frequency characteristics may vary with the measurement position, and the measurement accuracy may significantly degrade.

On the other hand, when orthogonal m-sequence codes serving as measurement signals are simultaneously outputted from the right speaker 101a and left speaker 101b and then the frequency characteristics are measured, interference occurs, since line spectra having the same frequency are out of phase. Thus, amplitude variations may occur in the combined respective line spectra. When amplitude variations occur, disadvantageously, the frequency characteristics of the sound field environment suffer from inter-symbol interference, and the measurement accuracy degrades. Further, when a short-period code is used as a measurement signal in order to reduce the measurement time or to reduce the usage of the memory used in the Fourier transform process, the intervals between the line spectra are increased. For this reason, even when the line spectra are averaged, the effect of inter-symbol interference cannot be reduced and thus the measurement accuracy tends to significantly degrade.

As a method for measuring frequency characteristics while avoiding inter-channel interference or avoiding inter-symbol interference between the line spectra, there is known a method of dividing the time into those for the L channel and R channel by first outputting a measurement signal only from the left speaker 101b, measuring the frequency characteristics, then outputting a measurement signal only from the right speaker 101a, and measuring the frequency characteristics. By measuring frequency characteristics by dividing the time in this manner, it is possible to avoid inter-channel interference or inter-symbol interference. However, two measurements have to be made for the L channel and R channel. This disadvantageously increases the measurement time, as well as increases the load of the measurement processing.

The present invention has been made in view of the above problems, and an object thereof is to provide a sound field measuring device, method, and program that can accurately measure the frequency characteristics of the sound field environment by simultaneously outputting measurement signals from a pair of speakers installed at a narrow interval.

Solution to Problem

To solve the above problem, according to the present invention, there is provided a sound field measuring device for obtaining frequency characteristics of a sound field by collecting output sound outputted from an audio system having a pair of speakers installed at a narrow interval therein. The sound field measuring device includes a low-pass filter configured to extract low-range components of a first measurement signal, a high-pass filter configured to extract mid/high-range components of a second measurement signal different from the first measurement signal, a combined signal generation unit configured to generate a combined signal by combining the low-range components of the first measurement signal extracted by the low-pass filter and the mid/high-range components of the second measurement signal extracted by the high-pass filter, an external output unit configured to output the first measurement signal whose low-range components have yet to be extracted by the low-pass filter and the combined signal generated by the combined signal generation unit to the audio system so that the first measurement signal is outputted from one of the pair of speakers and the combined signal is simultaneously outputted from the other of the pair of speakers, a microphone configured to collect the first measurement signal and the combined signal simultaneously outputted from the pair of speakers, and a Fourier transform unit configured to obtain the frequency characteristics of the sound field by Fourier transforming the signals collected by the microphone.

According to the present invention, there is provided a sound field measuring method using a sound field measuring device, the sound field measuring device obtaining frequency characteristics of a sound field by collecting output sound outputted from an audio system having a pair of speakers installed at a narrow interval therein. The sound field measuring method includes a low-range component extraction step in which a low-pass filter extracts low-range components of a first measurement signal, a mid/high-range component extraction step in which a high-pass filter extracts mid/high-range components of a second measurement signal different from the first measurement signal, a combined signal generation step in which a combined signal generation unit generates a combined signal by combining the low-range components of the first measurement signal extracted in the low-range component extraction step and the mid/high-range components of the second measurement signal extracted in the mid/high-range component extraction step, an external output step in which an external output unit outputs the first measurement signal whose low-range components have yet to be extracted in the low-range component extraction step and the combined signal generated in the combined signal generation step to the audio system so that the first measurement signal is outputted from one of the pair of speakers and the combined signal is simultaneously outputted from the other of the pair of speakers, a sound collection step in which a microphone collects the first measurement signal and the combined signal simultaneously outputted from the pair of speakers, and a Fourier transform step in which a Fourier transform unit obtains the frequency characteristics of the sound field by Fourier transforming the signals collected in the sound collection step.

According to the present invention, there is provided a sound field measuring program executed by a sound field measuring device for obtaining frequency characteristics of a sound field by collecting output sound outputted from an audio system having a pair of speakers installed at a narrow interval therein. The sound field measuring program causes a computer of the sound field measuring device to perform a low-pass filter function of extracting low-range components of a first measurement signal, a high-pass filter function of extracting mid/high-range components of a second measurement signal different from the first measurement signal, a combined signal generation function of generating a combined signal by combining the low-range components of the first measurement signal extracted by the low-pass filter function and the mid/high-range components of the second measurement signal extracted by the high-pass filter function, an external output function of outputting the first measurement signal whose low-range components have yet to be extracted by the low-pass filter function and the combined signal generated by the combined signal generation function to the audio system so that the first measurement signal is outputted from one of the pair of speakers and the combined signal is simultaneously outputted from the other of the pair of speakers, a sound collection function of collecting the first measurement signal and the combined signal simultaneously outputted from the pair of speakers using a microphone, and a Fourier transform function of obtaining the frequency characteristics of the sound field by Fourier transforming the signals collected by the sound collection function.

In installing a microphone in the front of an audio system having a pair of speakers at a narrow interval therein, the microphone tends to be installed at a short distance from the pair of speakers. If, in such a situation, the same measurement signals (mono measurement signals) are outputted from the pair of speakers and then the frequency characteristics are measured, dips may occur in the mid/high ranges due to the propagation delay difference between the output signals through the respective channels. For this reason, it is not easy to accurately measure the frequency characteristics of the sound field environment.

On the other hand, if different measurement signals (stereo measurement signals) are outputted from the pair of speakers, dips are less likely to occur in the mid/high ranges. However, inter-symbol interference between the measurement signals may occur in the low range. For this reason, it is not easy to accurately measure the frequency characteristics of the sound field environment.

In the sound field measuring device, method, and program according to the present invention, the first measurement signal is outputted from one of the speakers of the audio system, and the combined signal including the first measurement signal in the low range and the second measurement signal in mid/high ranges is outputted from the other speaker. Thus, it is possible to measure the frequency characteristics using the stereo measurement signal in the mid/high ranges and thus to suppress dips.

Further, the sound field measuring device, method, and program according to the present invention can measure the frequency characteristics using the mono measurement signal in the low range and thus can suppress the inter-symbol interference between the measurement signals.

As seen above, the sound field measuring device, method, and program according to the present invention can measure the frequency characteristics using the stereo measurement signal in the mid/high ranges and thus can suppress dips, as well as can measure the frequency characteristics using the mono measurement signal in the low range and thus can suppress the inter-symbol interference between the measurement signals. Further, the sound field measuring device, method, and program according to the present invention simultaneously output the first measurement signal and combined signal from the pair of speakers and then measure the frequency characteristics. Thus, it is possible to reduce the measurement load and increase the measurement speed compared to those when alternately outputting measurement signals from the pair of speakers and making measurements.

In the above sound field measuring device, an m-sequence code may be used as the first measurement signal, and an m-sequence code orthogonal to the m-sequence code serving as the first measurement signal may be used as the second measurement signal. The sound field measuring device may further include a maximum value detection unit configured to obtain frequency characteristics composed of maximum values by detecting a maximum value of signal levels in a predetermined first frequency range while shifting the first frequency range in steps of a shorter frequency range than the first frequency range, on the basis of the frequency characteristics obtained by the Fourier transform unit, and an average value calculation unit configured to obtain the frequency characteristics of the sound field by calculating an average value of signal levels in a predetermined second frequency range while shifting the second frequency range in steps of a shorter frequency range than the second frequency range, on the basis of frequency characteristics composed of the maximum values detected by the maximum value detection unit.

In the above sound field measuring method, an m-sequence code may be used as the first measurement signal, and an m-sequence code orthogonal to the m-sequence code serving as the first measurement signal may be used as the second measurement signal. The sound field measuring method may further include a maximum value detection step in which a maximum value detection unit obtains frequency characteristics composed of maximum values by detecting a maximum value of signal levels in a predetermined first frequency range while shifting the first frequency range in steps of a shorter frequency range than the first frequency range, on the basis of the frequency characteristics obtained in the Fourier transform step, and an average value calculation step in which an average value calculation unit obtains the frequency characteristics of the sound field by calculating an average value of signal levels in a predetermined second frequency range while shifting the second frequency range in steps of a shorter frequency range than the second frequency range, on the basis of frequency characteristics composed of the maximum values obtained in the maximum value detection step.

In the above sound field measuring program, an m-sequence code may be used as the first measurement signal, and an m-sequence code orthogonal to the m-sequence code serving as the first measurement signal may be used as the second measurement signal. The sound field measuring program may cause the computer to further perform a maximum value detection function of obtaining frequency characteristics composed of maximum values by detecting a maximum value of signal levels in a predetermined first frequency range while shifting the first frequency range in steps of a shorter frequency range than the first frequency range, on the basis of the frequency characteristics obtained by the Fourier transform function and an average value calculation function of obtaining the frequency characteristics of the sound field by calculating an average value of signal levels in a predetermined second frequency range while shifting the second frequency range in steps of a shorter frequency range than the second frequency range, on the basis of frequency characteristics composed of the maximum values detected by the maximum value detection function.

There has been known a method of measuring frequency characteristics using an m-sequence code as a measurement signal. However, when an m-sequence code serving as a measurement signal is collected using a microphone and then Fourier transformed, the length of samples obtained in the Fourier transform may be a non-integral multiple of the length of the m-sequence code, that is, these lengths may be asynchronous. When these lengths are asynchronous, low-level, varying line spectra may occur in the Fourier transformed frequency characteristics (line spectra), thereby degrading the measurement accuracy of the frequency characteristics.

For this reason, the sound field measuring device, method, and program according to the present invention use an m-sequence code as the first measurement signal and use an m-sequence code orthogonal to the m-sequence code serving as the first measurement signal, as the second measurement signal. By using such m-sequence codes, it is possible to achieve a stereo measurement signal in the mid/high ranges, as well as to achieve a mono measurement signal in the low range. Further, by detecting a maximum value of signal levels in the predetermined first frequency range while shifting the first frequency range in steps of a shorter frequency range than the first frequency range, on the basis of the frequency characteristics obtained by Fourier transforming the collected signals, it is possible to obtain frequency characteristics composed of the maximum values. By obtaining the frequency characteristics composed of the maximum values in this manner, it is possible to suppress (mask) low-level, varying line spectra acting as noise in the frequency characteristics.

Further, the sound field measuring device, method, and program according to the present invention calculate an average signal level in the predetermined second frequency range while shifting the second frequency range in steps of a shorter frequency range than the second frequency range, on the basis of the frequency characteristics composed of the maximum values. Thus, it is possible to obtain averaged frequency characteristics. As seen above, by obtaining frequency characteristics by detecting maximum values, as well as by averaging the frequency characteristics composed of the maximum values, it is possible to suppress changes which may occur in the frequency characteristics at each Fourier transform and thus to improve the detection accuracy of the frequency characteristics.

In the above sound field measuring device, cut-off frequencies set in the low-pass filter and the high-pass filter may be set to a lower frequency than a frequency value of a dip which can occur in the frequency characteristics obtained by the Fourier transform unit when the first measurement signal whose low-range components have yet to be extracted is simultaneously outputted from the pair of speakers.

In the above sound field measuring method, cut-off frequencies set in the low-range component extraction step and the mid/high-range component extraction step may be set to a lower frequency than a frequency value of a dip which can occur in the frequency characteristics obtained in the Fourier transform step when the first measurement signal whose low-range components have yet to be extracted is simultaneously outputted from the pair of speakers.

In the above sound field measuring program, cut-off frequencies set in the low-pass filter function and the high-pass filter function may be set to a lower frequency than a frequency value of a dip which can occur in the frequency characteristics obtained by the Fourier transform function when the first measurement signal whose low-range components have yet to be extracted is simultaneously outputted from the pair of speakers.

The sound field measuring device, method, and program according to the present invention set cut-off frequencies in the low-pass filter and the high-pass filter to a lower frequency than the frequency range in which dips can occur in the frequency characteristics measured by using the mono measurement signal. Thus, it is possible to set measurement signals in the mid/high-range in which dips can occur to stereo measurement signals and to improve the detection accuracy of the frequency characteristics.

Advantageous Effects of Invention

The sound field measuring device, method, and program according to the present invention can measure the frequency characteristics using the stereo measurement signal in the mid/high ranges and thus can suppress dips, as well as can measure the frequency characteristics using the mono measurement signal in the low range and thus can suppress the inter-symbol interference between the measurement signals. Further, the sound field measuring device, method, and program according to the present invention simultaneously output the first measurement signal and combined signal from the pair of speakers and then measure the frequency characteristics. Thus, it is possible to reduce the measurement load and increase the measurement speed compared to those when alternately outputting measurement signals from the pair of speakers and making measurements.

BRIEF DESCRIPTION OF DRAWINGS

FIG. 4($b$) shows the frequency characteristics of the extracted low-range components of the signal S1 in the upper part thereof and the frequency characteristics of the extracted mid/high-range components of the signal S2 in the lower part thereof; and FIG. 4($c$) is a diagram showing the frequency characteristics of a combined signal in which the low-range components of the signal S2 and the mid/high-range components of the signal S2 shown in the upper and lower parts of FIG. 4($b$) are combined.

FIG. 7 includes diagrams showing frequency characteristics obtained by performing a loopback measurement using a mono measurement signal, in which FIG. 7($a$) shows a case in which an averaging process was not performed and FIG. 7($b$) shows a case in which an averaging process was performed;

FIG. 9 includes diagrams showing frequency characteristics obtained by performing a loopback measurement using a combined signal, in which FIG. 9($a$) shows a case in which an averaging process was not performed and FIG. 9($b$) shows a case in which an averaging process was pedal lied;

FIG. 10 includes diagrams showing frequency characteristics obtained from a mono measurement signal outputted from a portable audio system, in which FIG. 10($a$) shows a case in which an averaging process was not performed and FIG. 10($b$) shows a case in which an averaging process was performed;

DESCRIPTION OF EMBODIMENTS

Figure 1:
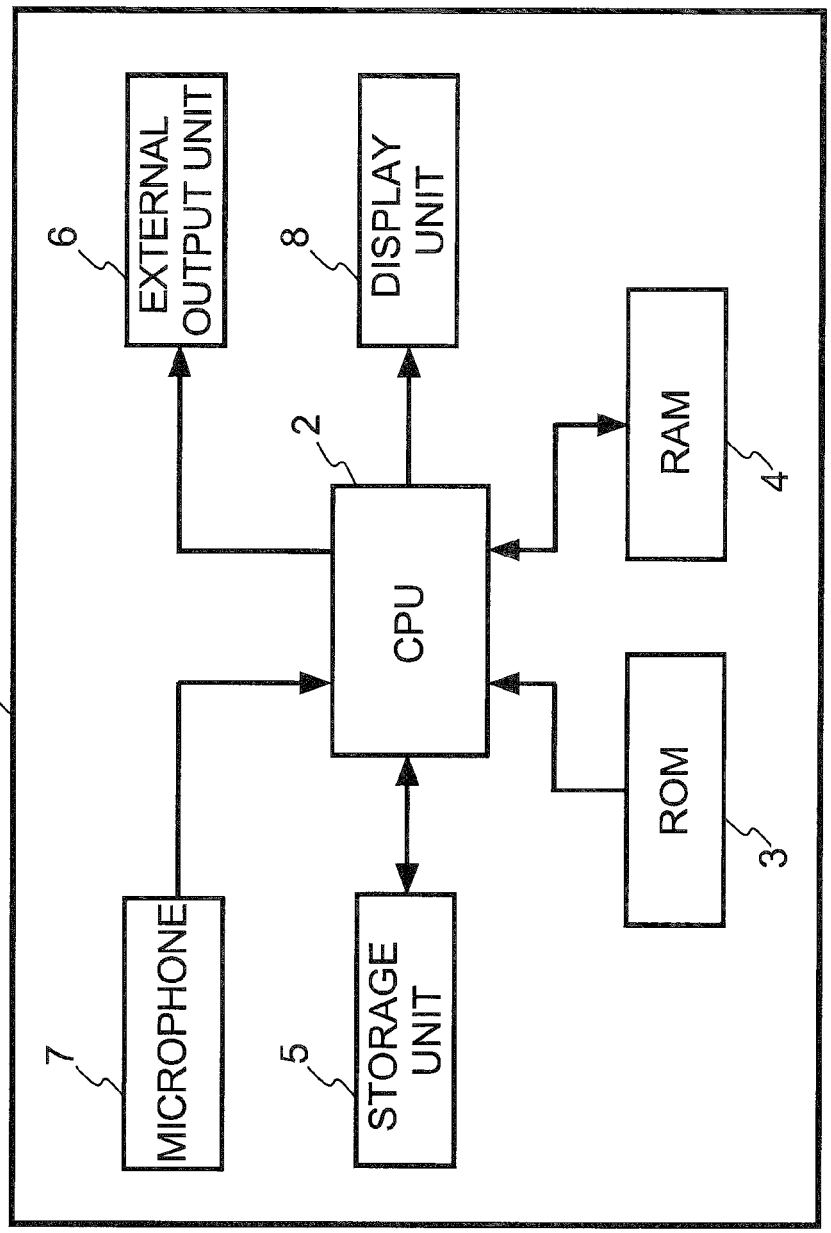
FIG. 1 is a block diagram showing a schematic hardware configuration of a sound field measuring device according to an embodiment.

Hereafter, a sound field measuring device according to the present invention will be described in detail with reference to the drawings. FIG. 1 is a block diagram showing an example schematic hardware configuration of the sound field measuring device according to the present invention. As shown in FIG. 1, a sound field measuring device 1 includes a CPU 2, a read only memory (ROM) 3, a random access memory (RAM) 4, a storage unit 5, an external output unit 6, a microphone 7, and a display unit 8.

The ROM 3 is storing a processing program and the like executed by the sound field measuring device 1. For example, when the sound field measuring device 1 is started, or in response to a user operation, the CPU 2 can perform a frequency characteristics measurement or the like by reading the processing program or the like in the ROM 3. The RAM 4 is used as a work area in which the CPU 2 performs processing, or for other purposes.

The storage unit 5 is so-called auxiliary storage and is typically in the form of a hard disk, solid state drive (SSD), non-volatile memory (e.g., flash ROM, flash memory), or the like. A removable memory card, such as an SD card, may be used as the storage unit 5. The storage unit 5 stores various types of data or the like that the CPU 2 uses to perform processing.

If an information mobile terminal, such as a smartphone, is used as the sound field measuring device 1, an application program obtained by download or the like may be recorded in the storage unit 5 so that frequency characteristics can be measured on the basis of the application program.

The external output unit 6 includes an external output terminal for outputting measurement signals (a signal S1 and a combined signal; to be discussed later) to an external input terminal of a portable audio system. When a measurement signal outputted through the external output unit 6 is inputted to an external input terminal of a portable audio system (audio system) 102 (see FIG. 2), measurement sound can be outputted from right and left speakers 101a, 101b (see FIG. 2) of the portable audio system 102. The external output unit 6 need not have a physical terminal structure. For example, the external output unit 6 may be configured to output a measurement signal to the portable audio system 102 using a wireless technology, such as the Bluetooth® or a wireless LAN.

The microphone 7 has a function of collecting measurement sound outputted by the portable audio system 102 or the like. The measurement sound collected by the microphone 7 is recorded in the RAM 4 or storage unit 5 and used in a frequency characteristics measurement (to be discussed later). The display unit 8 is typically in the form of a liquid crystal display, cathode-ray tube (CRT) display, or the like. The display unit 8 has a function of displaying the frequency characteristics of the sound field (e.g., frequency characteristics shown in FIGS. 7 to 12; to be discussed later) obtained by measuring the frequency characteristics, in such a manner that the user can visually recognize the frequency characteristics.

Figure 2:
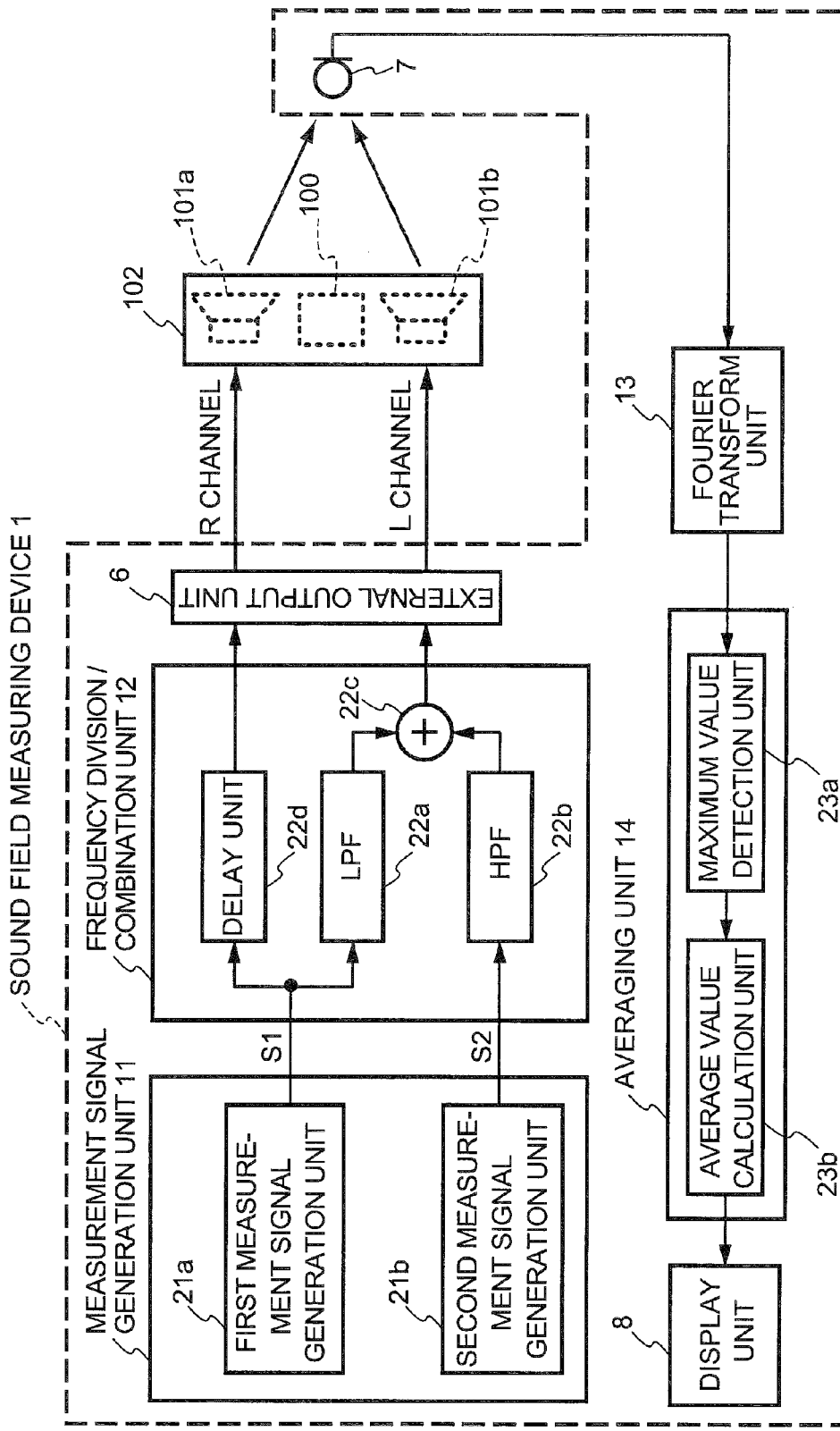
FIG. 2 is a block diagram showing a schematic configuration of the function elements of the sound field measuring device when a CPU according to the embodiment measures frequency characteristics on the basis of a processing program.
Figure 3:
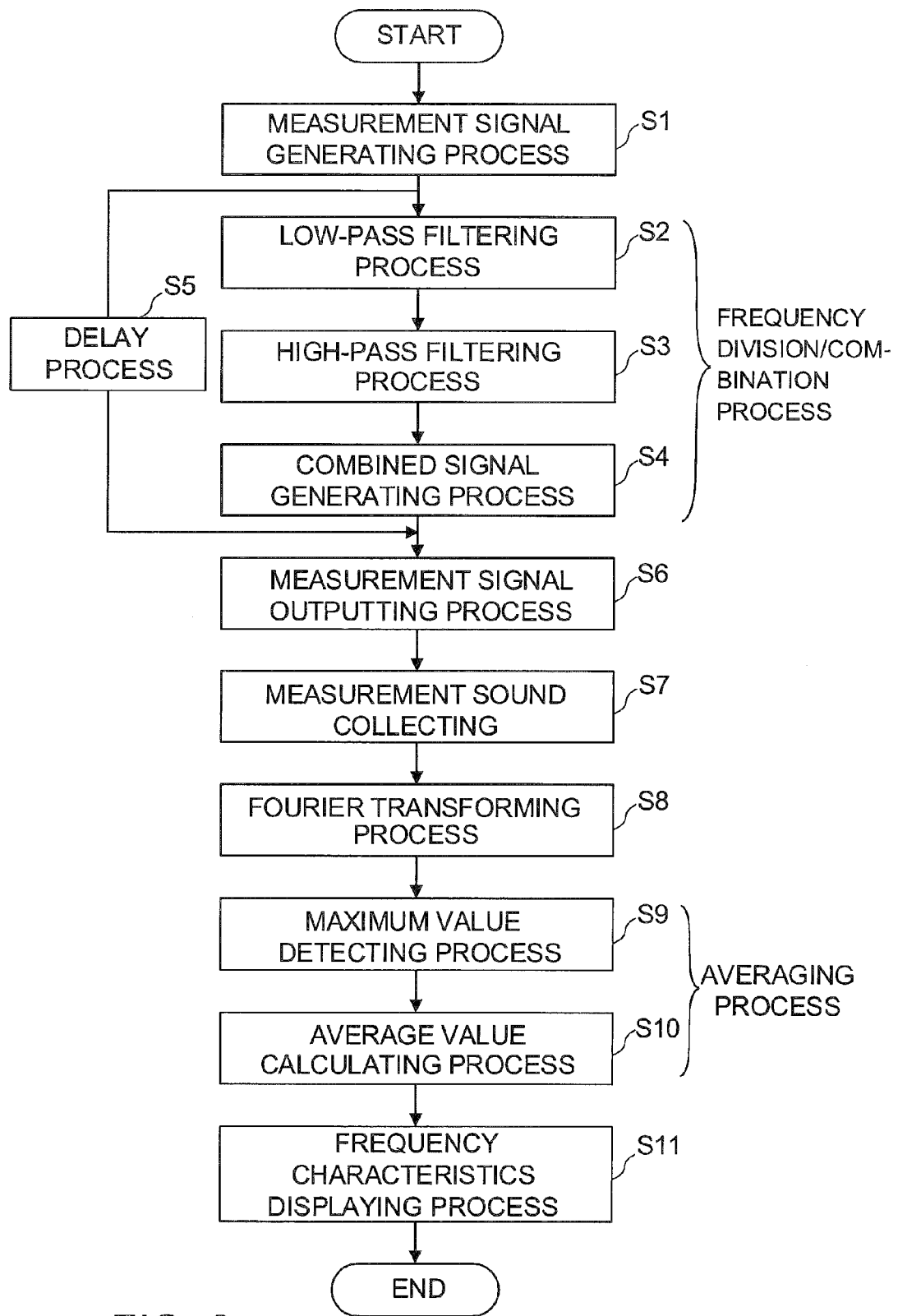
FIG. 3 is a flowchart showing a frequency characteristics measurement process performed by the CPU according to the embodiment.

The CPU 2 has a function of measuring the frequency characteristics between the portable audio system 102 and microphone 7 in accordance with the processing program stored in the ROM 3 or the application program for measuring frequency characteristics stored in the storage unit 5. FIG. 2 is a block diagram showing a schematic configuration of the function elements of the sound field measuring device 1 when the CPU 2 measures the frequency characteristics on the basis of the processing program or application program. FIG. 3 is a flowchart showing a process performed by the CPU 2 on the basis of the processing program or the like.

Figure 14:
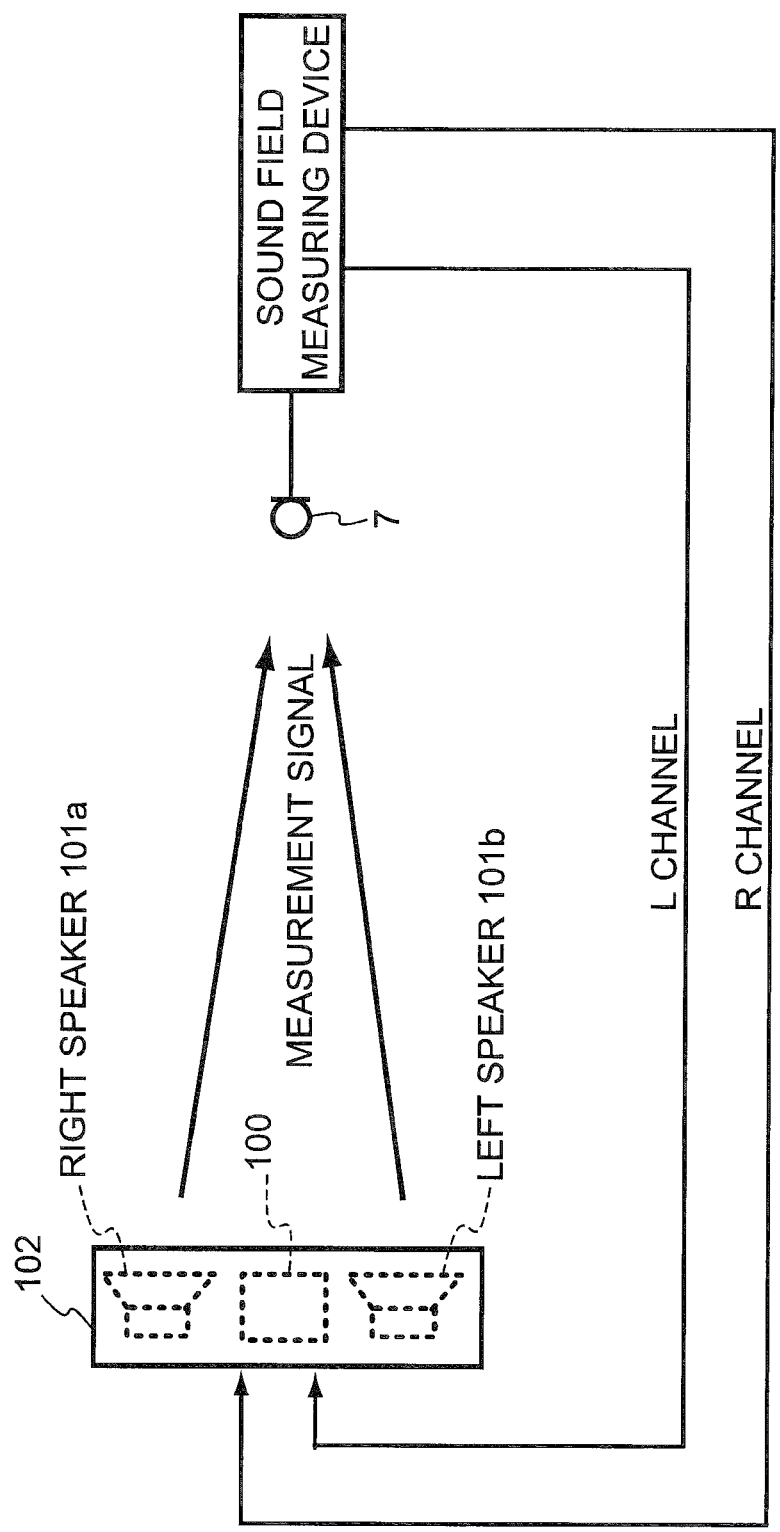
FIG. 14 is a diagram showing a typical method for measuring the frequency characteristics of a portable audio system using a sound field measuring device.

As shown in FIG. 2, the sound field measuring device 1 includes a measurement signal generation unit 11, a frequency division/combination unit 12, a Fourier transform unit 13, an averaging unit 14, the external output unit 6, the microphone 7, and the display unit 8. FIG. 2 also shows the portable audio system 102 shown in FIG. 14. Since the external output unit 6, microphone 7, and display unit 8 have been described with reference to FIG. 1, these elements will not be described.

As shown in FIG. 2, the measurement signal generation unit 11 includes a first measurement signal generation unit 21a and a second measurement signal generation unit 21b. The measurement signal generation unit 11 generates m-sequence codes having different generating polynomials, as measurement signals. Specifically, an m-sequence code generated by the first measurement signal generation unit 21a and an m-sequence code generated by the second measurement signal generation unit 21b are orthogonal to each other. In the present embodiment, for convenience, an m-sequence code generated by the first measurement signal generation unit 21a and an m-sequence code generated by the second measurement signal generation unit 21b will be referred to as a signal S1 and a signal S2, respectively.

An m-sequence is a pseudo-random number sequence. An m-sequence code is generated by performing feedback using a shift register having a predetermined length and exclusive OR. Assuming that the length of the shift register is n, the period (length) of the sequence is $2^n-1$, and the feedback position of the shift register is obtained using a generating polynomial. An m-sequence code is a binary sequence composed of 0s and 1s and is a signal including many direct-current components, and therefore is subjected to the conversion of 0s into −1s and then outputted.

The CPU 2 generates a signal S1 and a signal S2 in the measurement signal generation unit 11 in accordance with the processing program or the like (S1 in FIG. 3). The generated signals S1 and S2 are outputted to the frequency division/combination unit 12.

As shown in FIG. 2, the frequency division/combination unit 12 includes an LPF (low-pass filter) 22a, an HPF (high-pass filter) 22b, an addition unit (combined signal generation unit) 22c, and a delay unit 22d. The signal S1 generated in the measurement signal generation unit 11 is inputted to the LPF 22a and delay unit 22d, and the signal S2 is inputted to the HPF 22b.

The LPF 22a is a low-pass filter that allows low-range signals to pass therethrough. The HPF 22b is a high-pass filter that allows mid/high-range signals to pass therethrough. The cut-off frequencies of the LPF 22a and HPF 22b are set to the same value. Details of the set cut-off frequencies will be described later.

Figure 4:
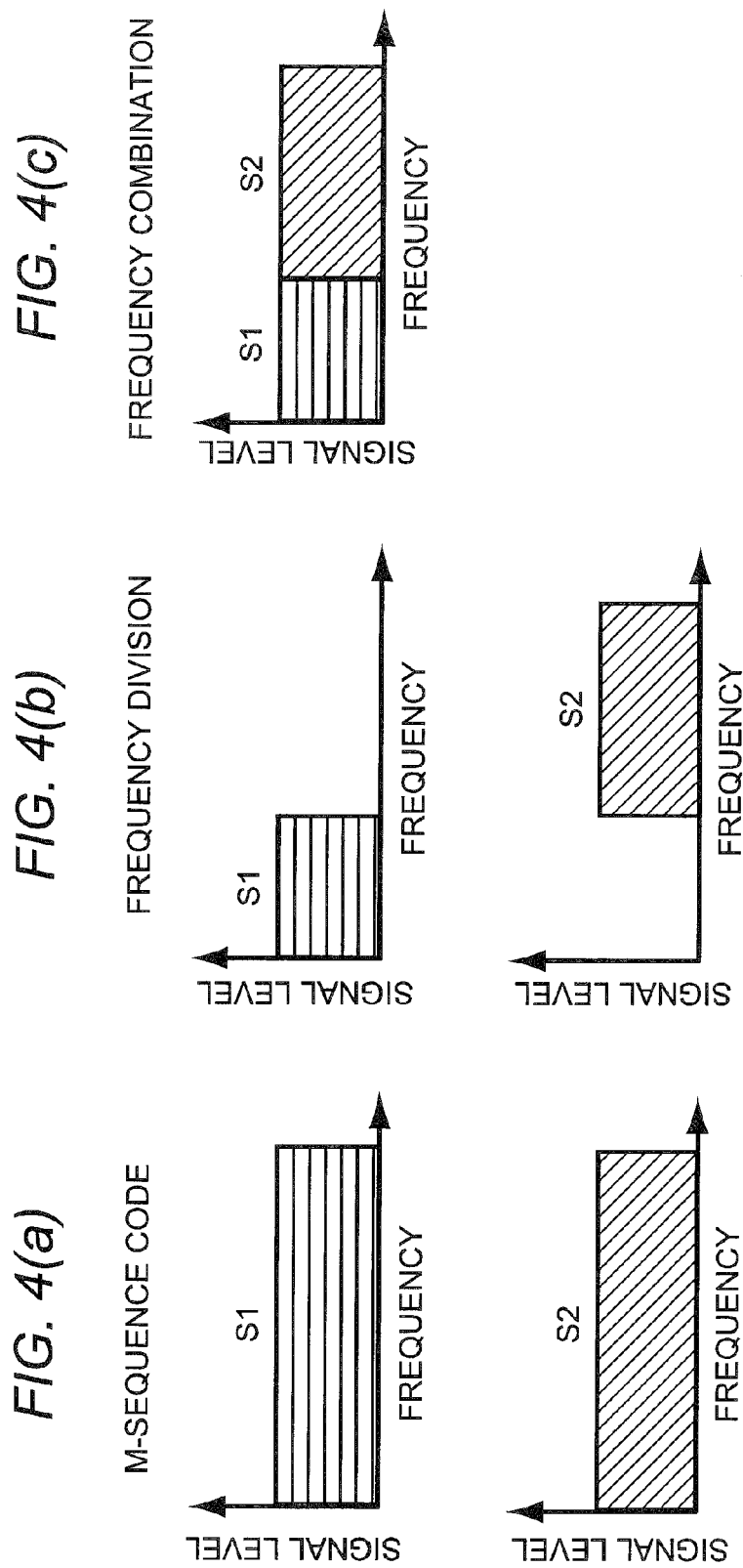
FIG. 4($a$) shows the frequency characteristics of a signal S1 in the upper part thereof and frequency characteristics of a signal S2 in the lower part thereof.

The upper part of FIG. 4(a) shows the frequency characteristics of the signal S1, and the lower part thereof shows the frequency characteristics of the signal S2. When the signal S1 shown in the upper part of FIG. 4(a) is inputted to the LPF 22a and then low-pass filtered, the low-range components of the signal S1 are extracted, as shown in the upper part of FIG. 4(b) (S2 in FIG. 3; low-range component extraction step; low-pass filter function). On the other hand, when the signal S2 shown in the lower part of FIG. 4(a) is inputted to the HPF 22b and then high-pass filtered, the mid/high-range components of the signal S2 are extracted, as shown in the lower part of FIG. 4(b) (S3 in FIG. 3; mid/high-range component extraction step; high-pass filter function).

The addition unit 22c has a function of combining the signal S1 filtered by the LPF 22a and the signal S2 filtered by the HPF 22b. The addition unit 22c combines the signal S1 outputted by the LPF 22a (the upper part of FIG. 4(b)) and the signal S2 outputted by the HPF 22b (the lower part of FIG. 4(b)), thereby generating a combined signal including the components of the signal S1 in the low range and the components of the signal S2 in the mid/high ranges, as shown in FIG. 4(c) (S4 in FIG. 3; combined signal generation step; combined signal generation function).

The delay unit 22d has a function of delaying the inputted signal S1. Specifically, the delay unit 22d delays the timing at which it outputs the signal S1, in accordance with the time taken by the filtering and addition processes performed by the LPF 22a, HPF 22b, and addition unit 22c. Due to this delay process, an adjustment is made between the timing at which the delay unit 22d outputs the signal S1 and the timing at which the addition unit 22c outputs the combined signal (S5 in FIG. 3).

As seen above, in the frequency division/combination unit 12, the CPU 2 generates the combined signal including the components of the signal S1 in the low range and the components of the signal S2 in mid/high ranges, on the basis of the signals S1 and S2, as well as delays the signal S1 (S2 to S5 in FIG. 3; frequency division/combination process). The CPU 2 then outputs the generated combined signal as an L-channel measurement signal to the portable audio system 102 through the external output unit 6. The CPU 2 also outputs the delayed signal S1 as an R-channel measurement signal to the portable audio system 102 through the external output unit 6 (S6 in FIG. 3; external output step; external output function).

The portable audio system 102 outputs the inputted L-channel measurement signal and R-channel measurement signal (combined signal and signal S1) from the left speaker 101b and right speaker 101a, respectively. In this case, the portable audio system 102 simultaneously outputs the L-channel measurement signal and R-channel measurement signal. By simultaneously outputting the L-channel measurement signal and R-channel measurement signal, the low-range signal components of the L-channel measurement signal and those of the R-channel measurement signal are both the signals S1, which are the same m-sequence codes, and serve as mono measurement signals. On the other hand, the mid/high-range signal components of the L-channel measurement signal are the signal S2, whereas those of the R-channel measurement signal are the signal S1. Accordingly, the respective mid/high-range signal components of the L-channel and R-channel measurement signals are orthogonal m-sequence code signals and serve as stereo measurement signals.

The CPU 2 collects the measurement signals indicating measurement sound outputted from the right and left speakers 101a, 101b of the portable audio system 102 using the microphone 7 (S7 in FIG. 3; sound collection step; sound collection function). The collected measurement signals are outputted to the Fourier transform unit 13.

The Fourier transform unit 13 has a function of performing Fourier transform (fast Fourier transform (FFT)) on the collected measurement signals. In the Fourier transform unit 13, the CPU 2 weights the collected measurement signals using window functions and then Fourier transforms the resulting signals. In this Fourier transform process, the CPU 2 converts the time-domain measurement signals into frequency-domain signals and outputs line spectra at each Fourier transform (S8 in FIG. 3; Fourier transform step; Fourier transform function). As used herein, a line spectrum refers to a power spectrum. The number of line spectra is half the length of samples obtained in the Fourier transform process. The Fourier transformed measurement signals are outputted to the averaging unit 14.

Figure 5:
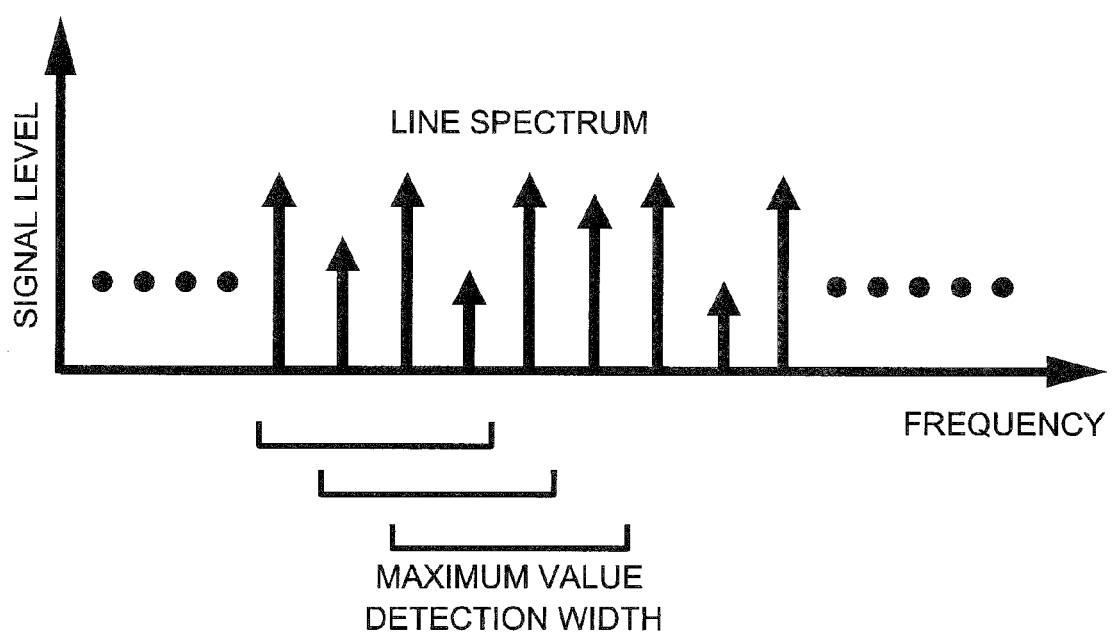
FIG. 5 is a diagram showing a process of detecting the maximum value of the signal levels of a predetermined number of line spectra (a predetermined number of samples) of a Fourier transformed measurement signal while shifting the predetermined number of line spectra in steps of one line spectrum (in steps of one sample), so as to obtain an envelope of the line spectra.

The averaging unit 14 has a function of detecting the maximum of the values of every predetermined number of samples of each Fourier transformed measurement signal and calculating the average of the detected maximum values. As shown in FIG. 2, the averaging unit 14 includes a maximum value detection unit 23a and an average value calculation unit 23b. As shown in FIG. 5, the maximum value detection unit 23a has a function of detecting the maximum value of the signal levels of a predetermined number of line spectra (a predetermined number of samples) of each Fourier transformed measurement signal while shifting the predetermined number of line spectra from the low range toward the high range in steps of one line spectrum (in steps of one sample) to obtain an envelope of the line spectra (S9 in FIG. 3; maximum value detection step; maximum value detection function). Similarly, the average value calculation unit 23b has a function of calculating the average value of the signal levels of a predetermined number of samples in the line spectra composed of the maximum values obtained by the maximum value detection unit 23a while shifting the predetermined number of samples from the low range toward the high range in steps of one sample (S10 in FIG. 3; average value calculation step; average value calculation function).

Figure 6:
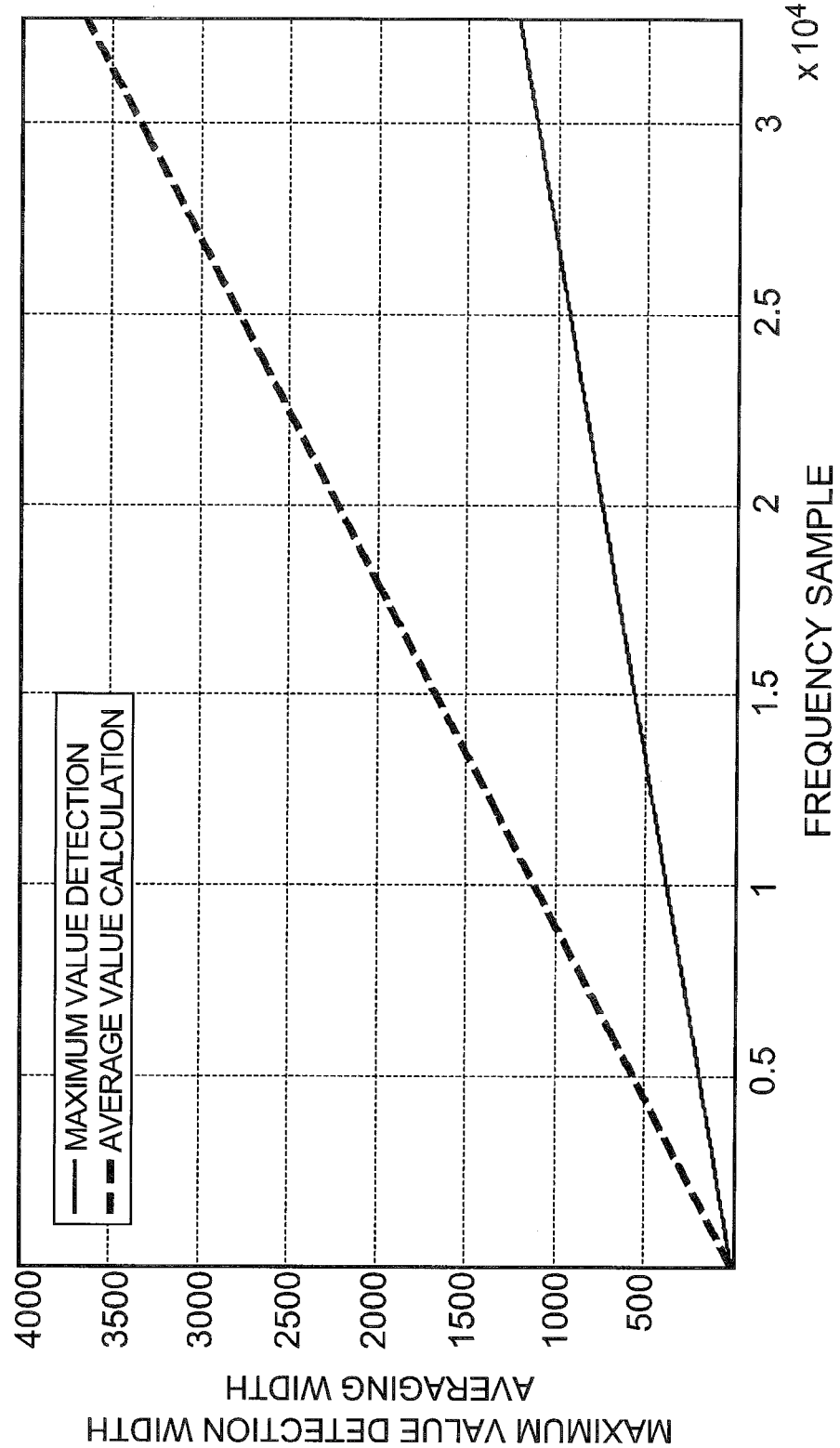
FIG. 6 is a diagram showing the relationship between a sample number width for detecting a maximum value (maximum value detection width) and a sample number width for calculating an average value (averaging width) set according to the number of frequency samples.

FIG. 6 is a diagram showing a sample number width for detecting a maximum value (maximum value detection width) and a sample number width for calculating an average value (averaging width) set in accordance with the number of frequency samples when the predetermined number of line spectra are shifted in steps of one sample. In FIG. 6, the length of samples obtained in Fourier transform is 65,536, and the number of line spectra is 32, 768. The frequency sample number represented by the horizontal axis of FIG. 6 is a value corresponding to the line spectrum number. As shown in FIG. 6, both the predetermined sample number for detecting a maximum value and the predetermined sample number for calculating an average value vary with the frequency sample number. That is, the maximum value detection width and averaging width are set so as to be increased as the frequency sample number is increased from the low range toward the high range. The CPU 2 performs a $\frac{1}{18}$ octave maximum value detection process by setting the maximum value detection width as shown in FIG. 6 (S9 in FIG. 3). The CPU 2 also performs a $\frac{1}{6}$ octave average value calculation process by setting the averaging width as shown in FIG. 6 (S10 in FIG. 3). The resolution of the auditory sense is known to be about $\frac{1}{3}$ octave. For this reason, the averaging unit 14 (maximum value detection unit 23a and average value calculation unit 23b) can perform an averaging process (maximum value detection process and average value calculation process) with sufficiently high resolution by setting the maximum value detection width and averaging width as shown in FIG. 6.

As described above, the length of an m-sequence code is $2^n-1$. On the other hand, when the collected measurement signal is Fourier transformed, the sample length is not typically an integral multiple of the length of the m-sequence code. That is, these lengths may be asynchronous. For this reason, when frequency characteristics are obtained by collecting an m-sequence code serving as a measurement signal and then Fourier transforming the m-sequence code, low-level, varying line spectra may occur between uniform line spectra at each Fourier transform. These low-level, varying line spectra may act as noise in the detected frequency characteristics. However, the maximum value detection unit 23a obtains frequency characteristics by extracting a highest-level line spectrum from every predetermined number of samples. Thus, it is possible to suppress low-level, varying line spectra acting as noise. Further, the average value calculation unit 23b calculates average values in parallel. Thus, it is possible to prevent the frequency characteristics from varying at each Fourier transform.

After detecting the maximum values in the maximum value detection unit 23a and calculating the average values in the average value calculation unit 23b, the averaging unit 14 outputs the resulting frequency characteristics to the display unit 8 in accordance with an instruction of the CPU 2. Note that the CPU 2 may output the frequency characteristics obtained by the Fourier transform unit 13 to the display unit 8 as they are, without performing an averaging process in the averaging unit 14. The display unit 8 receives the frequency characteristics and displays them on the display screen or the like thereof in accordance with an instruction of the CPU 2 in such a manner that the user can visually recognize the frequency characteristics (S11 in FIG. 3).

FIGS. 7 to 9 and 10 to 12 show examples of the frequency characteristics displayed on the display unit 8. (a) of each diagram shows a case in which the frequency characteristics obtained from the collected measurement signal have not been subjected to an averaging process by the averaging unit 14 (a maximum value detection process by the maximum value detection unit 23a and an average value calculation process by the average value calculation unit 23b). (b) of each diagram shows a case in which the frequency characteristics obtained from the collected measurement signal have been subjected to an averaging process by the averaging unit 14.

The measurement conditions of the frequency characteristics shown in FIGS. 7 to 9 and 10 to 12 were as follows: m-sequence codes were used as measurement signals; the sampling speed of the measurement signals was 44.1 kHz; the length of the m-sequence codes was 32, 767; the low-range and mid/high-range pass filters of the LPF 22*a* and HPF 22*b* of the frequency division/combination unit 12 were 512-tap FIR filters; and the cut-off frequencies were 1 kHz. The sample length when the Fourier transform unit 13 performed Fourier transform was 65, 536. The window functions used by the Fourier transform unit 13 were Hamming windows; the maximum value detection width set by the maximum value detection unit 23*a* was ⅛ octave; and the averaging width set by the average value calculation unit 23*b* was ⅙ octave.

Figure 8A:
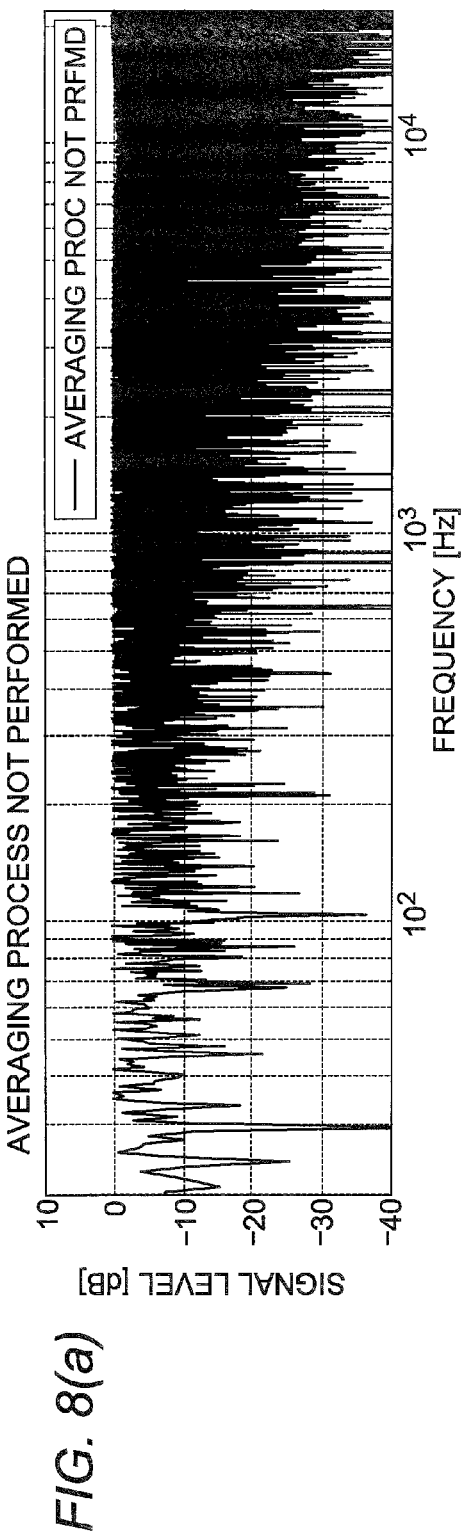
FIG. 8 includes diagrams showing frequency characteristics obtained by performing a loopback measurement using a stereo measurement signal, in which FIG. 8($a$) shows a case in which an averaging process was not performed and FIG. 8($b$) shows a case in which an averaging process was performed.
Figure 8B:
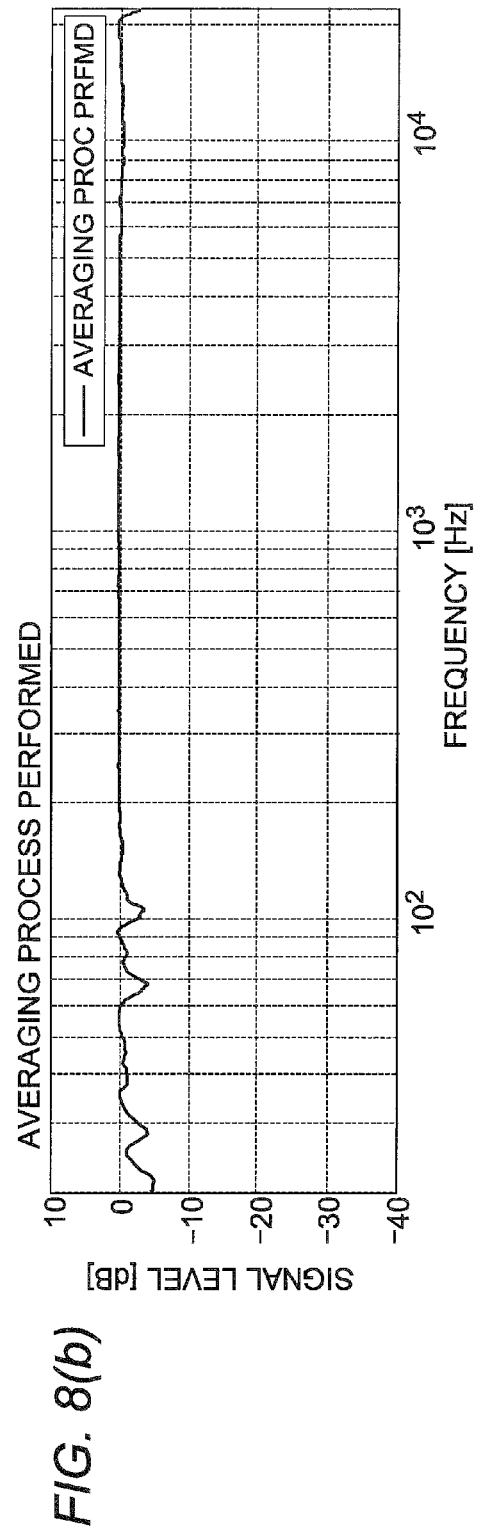
Figure 11A:
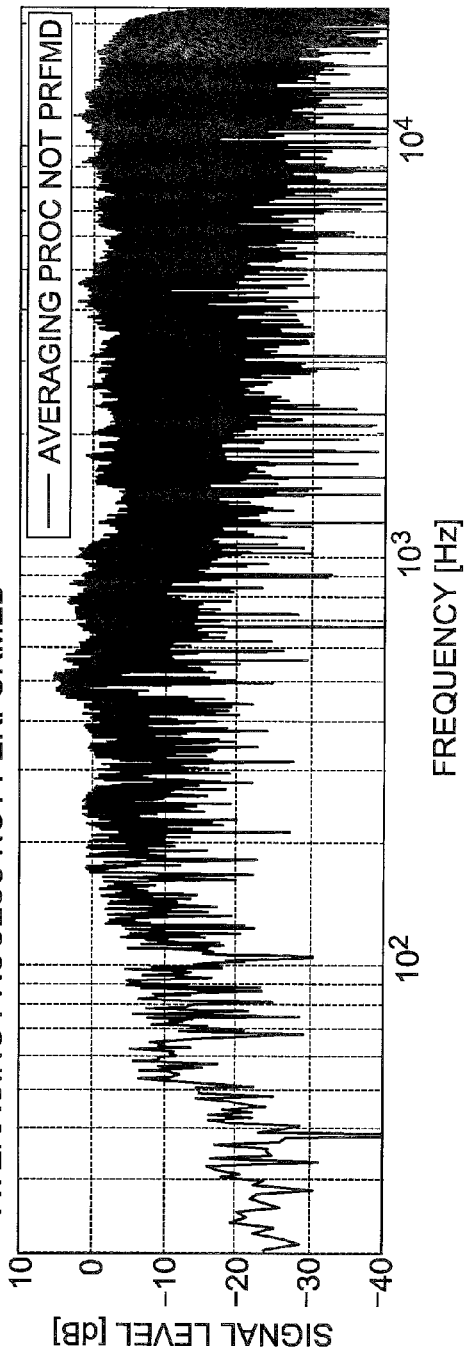
FIG. 11 includes diagrams showing frequency characteristics obtained from a stereo measurement signal outputted from a portable audio system, in which FIG. 10($a$) shows a case in which an averaging process was not performed and FIG. 10($b$) shows a case in which an averaging process was performed.
Figure 11B:
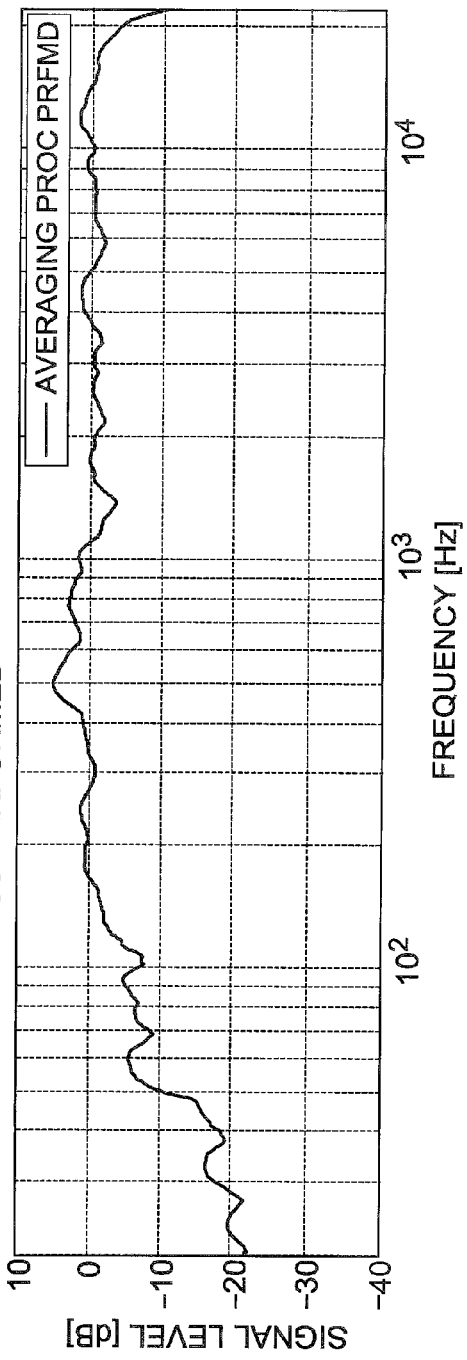
Figure 12A:
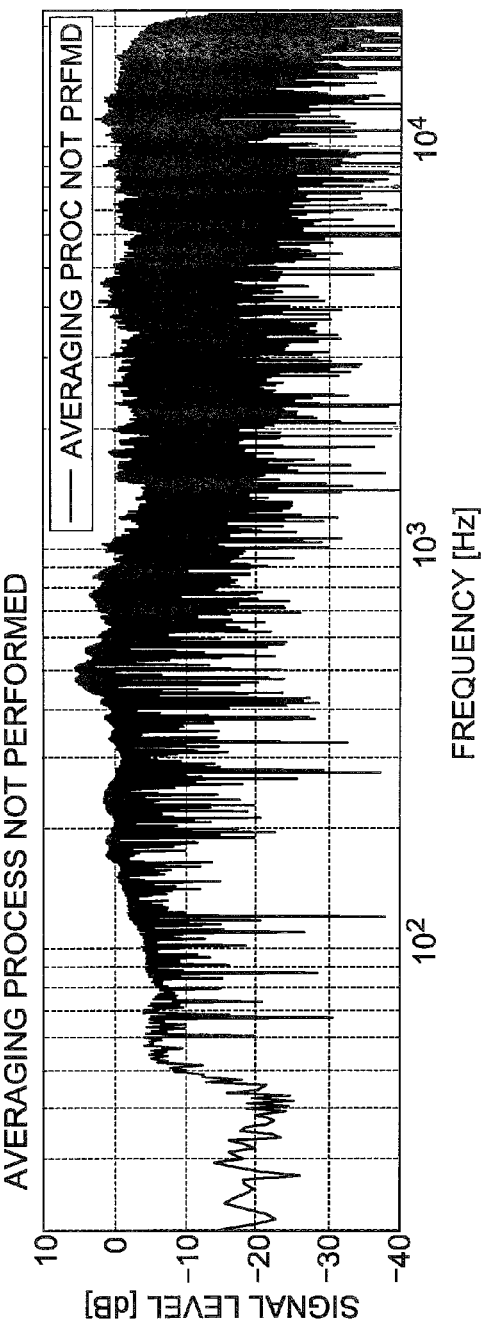
FIG. 12 includes diagrams showing frequency characteristics obtained from a combined measurement signal outputted from a portable audio system, in which FIG. 12($a$) shows a case in which an averaging process was not performed and FIG. 12($b$) shows a case in which an averaging process was performed.
Figure 12B:
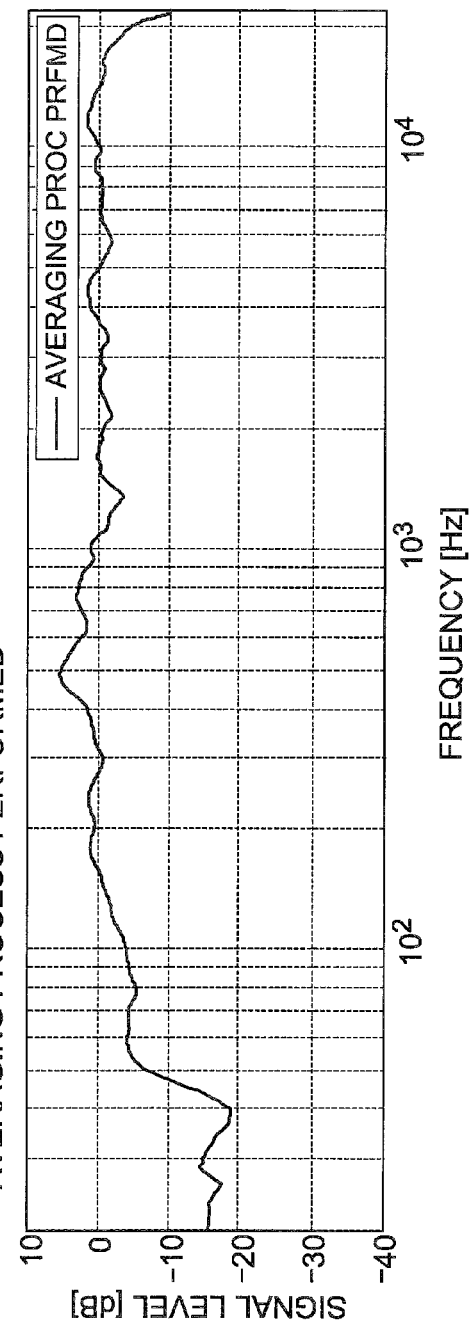

FIGS. 7 and 10 show cases in which the L-channel and R-channel measurement signals which were the same m-sequence codes were inputted to the portable audio system 102 as mono measurement signals. FIGS. 8 and 11 show cases in which the L-channel and R-channel measurement signals were orthogonal m-sequence codes and were inputted to the portable audio system 102 as stereo measurement signals. FIGS. 9 and 12 show cases in which, as described above, the signal S1 (see the upper part of FIG. 4(*a*)) was inputted to the portable audio system 102 as the R-channel measurement signal and the combined signal in which the signal S1 and signal S2 were combined using 1 kHz as a boundary (see FIG. 4(*c*)) serving as a combined measurement signal was inputted thereto as the L-channel measurement signal.

FIGS. 7 to 9 also show cases in which the frequency characteristics were measured by loopback in order to remarkably show the effect of inter-channel interference which may occur in a mono measurement signal due to a subtle delay time difference or the effect of inter-symbol interference which may occur in a stereo measurement signal due to a subtle delay time difference. As used herein, "measuring the frequency characteristics by loopback" refers to not measuring the frequency characteristics by "outputting the measurement signals outputted from the external output unit 6, collecting the measurement signals outputted from the right speaker 101*a* and left speaker 101*b* of the portable audio system 102 using the microphone 7, and outputting the collected measurement signals to the Fourier transform unit 13," but measuring the frequency characteristics by "outputting the measurement signals from the external output unit 6 directly to the Fourier transform unit 13." By using such loopback measurement, it is possible to obtain ideal flat frequency characteristics and thus to easily identify noise or the like in the measurement process. FIGS. 7 to 9 also show cases in which the sound field measurement device 1 measured the frequency characteristics in which the R-channel measurement signal was propagated later than the L-channel measurement signal by 0.00009 sec (3.1 cm).

On the other hand, FIGS. 10 to 12 show cases in which the frequency characteristics were measured by "outputting the measurement signals from the external output unit 6, collecting the measurement signals outputted from the right speaker 101*a* and left speaker 101*b* of the portable audio system 102 using the microphone 7, and outputting the collected measurement signals to the Fourier transform unit 13." Accordingly, FIGS. 10 to 12 show the frequency characteristics of the sound field measured in the installation position of the microphone 7. FIGS. 10 to 12 also show the frequency characteristics measured by collecting the measurement signals using the microphone 7 in a state in which the R-channel measurement signal was propagated later than the L-channel measurement signal by 0.00009 sec (3.1 cm).

The frequency characteristics of the mono measurement signal shown in FIG. 7 indicate that the maximum value of the line spectrum in the low range did not significantly vary, that is, was uniform (a state in which the signal level uniformly showed 0 dB), whether an averaging process was performed (see FIG. 7(*b*)) or not (see FIG. 7(*a*)). On the other hand, these frequency characteristics indicate that large dips occurred in the mid/high ranges due to inter-channel interference, whether an averaging process was performed or not, and that the interval between the dips was about 11 kHz, which is the reciprocal of the propagation delay time (see FIGS. 7(*a*), 7(*b*)). The position of a dip significantly varies with the delay time difference between the L-channel and R-channel measurement signals, and the delay time difference varies with the position in which the microphone 7 measures the measurement signal. When the delay time difference varies, the frequency characteristics vary as well. Thus, the measurement accuracy may significantly degrade.

On the other hand, the frequency characteristics of the stereo measurement signal when an averaging process was not performed (see FIG. 8(*a*)) indicate that the maximum value of the line spectrum varied and, in particular, significantly varied in the low range. The frequency characteristics of the stereo measurement signal when an averaging process was performed (see FIG. 8(*b*)) also indicate that the signal level significantly varied in the low range, in which a smaller number of line spectra were present. As seen above, when a stereo measurement signal is used, the frequency characteristics of the sound field environment suffer from inter-symbol interference. Thus, the measurement accuracy of the frequency characteristics in the low range tends to degrade.

In the frequency characteristics obtained using the combined signal shown in FIG. 9, the measurement signal in the low range is a mono measurement signal, and the measurement signal in the mid/high ranges is a stereo measurement signal. The frequency characteristics obtained on the basis of these measurement signals indicate that the maximum value of the line spectrum showed a uniform signal level in all the ranges when an averaging process was not performed (see FIG. 9(*a*)). Even when an averaging process was performed (see FIG. 9(*b*)), the signal level was uniform in all the ranges.

As described with reference to FIG. 7, when the frequency characteristics are measured using mono measurement signals, dips may occur in the mid/high ranges due to the delay time difference between the L-channel measurement signal and R-channel measurement signal. For this reason, as shown in FIG. 9, the frequency characteristics are measured by using a stereo measurement signal in the mid/high ranges. Thus, it is possible to suppress dips in the mid/high ranges and thus to improve the measurement accuracy of the frequency characteristics. Further, as described with reference to FIG. 8, when the frequency characteristics are measured using a stereo measurement signal, inter-symbol interference tends to occur. In particular, the signal level may significantly vary in the low range, in which a smaller number of line spectra are present. For this reason, as shown in FIG. 9, the frequency characteristics are measured by using a mono measurement signal in the low range. Thus, it is possible to reduce inter-symbol interference and thus to suppress variations in signal level even in the low range, in which a smaller number of line spectra are present. Accordingly, as shown in FIG. 9, by using a mono measurement signal as a measurement signal in the low range and a stereo measurement signal as a measurement signal in the mid/high ranges, it is possible to realize both the suppression of inter-channel interference in the mid/high ranges and the reduction in inter-symbol interference in the low range. Thus, it is possible to accurately measure the frequency characteristics of the sound field environment.

As shown in FIGS. 10 to 12, even when the frequency characteristics of the sound field were measured by actually outputting a mono measurement signal, a stereo measurement signal, and a combined measurement signal (combined signal) from the right and left speakers 101a, 101b of the portable audio system 102, characteristics similar to the frequency characteristics shown in FIGS. 7 to 9 were shown. As with FIG. 7, FIG. 10 indicates that dips occurred in the mid/high ranges due to inter-channel interference. As with FIG. 8, FIG. 11 indicates that the signal level significantly varied in the low range due to inter-symbol interference. On the other hand, as with FIG. 9, FIG. 12 indicates that dips were suppressed in the mid/high ranges and that variations in signal level were suppressed in the low range. That is, as with FIG. 9, FIG. 12 also indicates that by using a mono measurement signal as a measurement signal in the low range and a stereo measurement signal as a measurement signal in the mid/high ranges, it is possible to realize both the suppression of inter-channel interference in the mid/high ranges and the reduction of inter-symbol interference in the low range and thus to accurately measure the frequency characteristics of the sound field environment.

For this reason, the sound field is corrected by obtaining the frequency characteristics of the sound field environment including the position of the portable audio system 102 and the listening position in which the measurement signals were collected using the microphone 7, on the basis of the averaged frequency characteristics shown in FIG. 12 and then adjusting the equalizer of the portable audio system 102 on the basis of the obtained frequency characteristics. By correcting the sound field as described above, it is possible to improve the sound quality of the listening position. Further, by previously correcting music outputted from the right and left speakers 101a, 101b of the portable audio system 102 on the basis of the obtained frequency characteristics and then outputting the corrected music from the right and left speakers 101a, 101b of the portable audio system 102, it is possible to improve the quality of sound listened to in the listening position.

As described above, the length of an m-sequence code used as a measurement signal is $2^n-1$. On the other hand, when the measurement signal is Fourier transformed, the sample length is not typically an integral multiple of the length of the m-sequence code. That is, these lengths tend to be asynchronous. Accordingly, when the Fourier transform unit 13 obtains the frequency characteristics by Fourier transforming the collected measurement signal (m-sequence code), low-level, varying line spectra may occur between uniform line spectra. Such line spectra may act as noise when detecting the frequency characteristics. For this reason, the sound field measuring device 1 according to the present embodiment obtains the frequency characteristics by extracting a highest-level line spectrum from every predetermined number of samples in the maximum value detection unit 23a. Thus, it is possible to suppress low-level, varying line spectra acting as noise. Further, by calculating average values in parallel, it is possible to prevent the frequency characteristics from varying at each Fourier transform.

Figure 13:
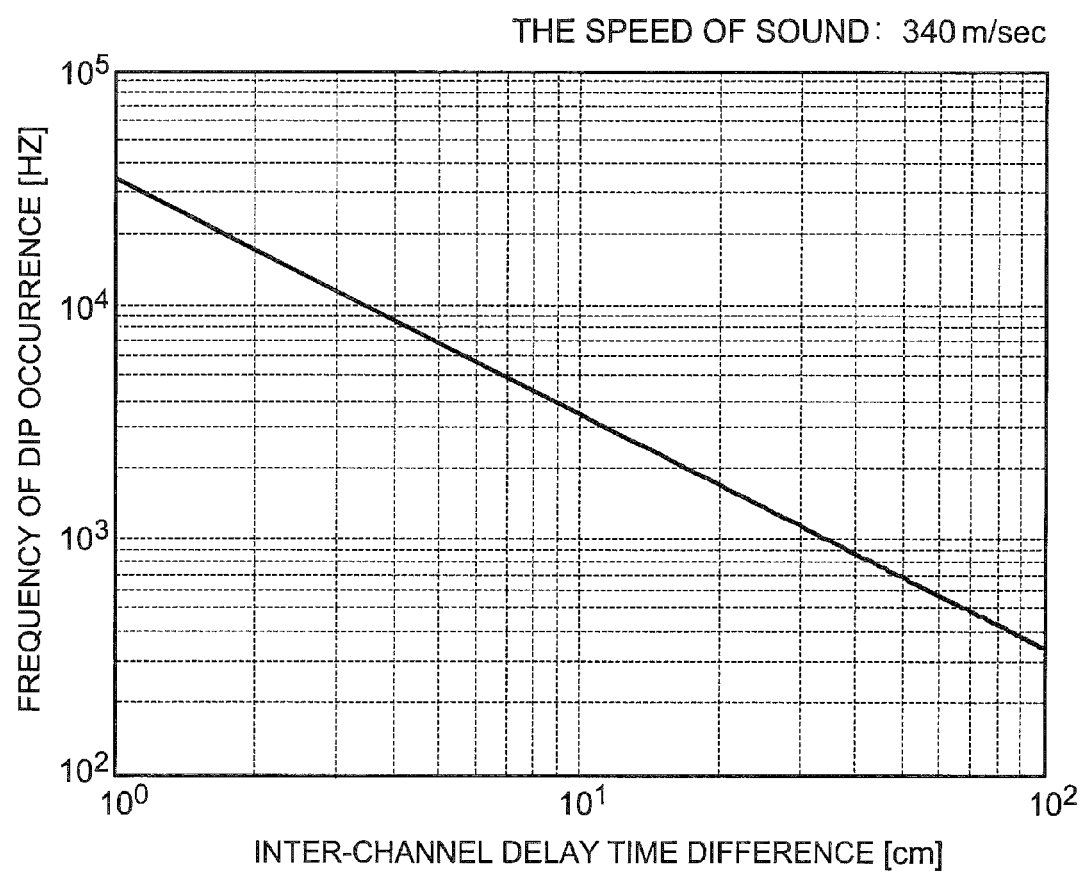
FIG. 13 is a diagram showing the relationship between the inter-channel delay time difference and the frequency range in which dips may occur.

As shown in FIG. 13, the frequency range in which dips may occur due to inter-channel interference varies with the propagation delay difference. If the right and left speakers 101a, 101b are installed at a narrow interval and in positions relatively close to the listener and thus the listener hears direct sound more clearly than indirect sound, the inter-channel propagation delay difference is about several centimeters, and the frequency range in which dips may occur is around 10 kHz. For this reason, it is preferred to set the cut-off frequencies of the filters of the LPF 22a and HPF 22b of the frequency division/combination unit 12 to around 1 kHz, which is a sufficiently lower frequency than the frequency range in which dips may occur. By setting the cut-off frequencies to around 1 kHz, it is possible to use a mono measurement signal, which is less likely to cause dips, as a measurement signal for the mid/high ranges covering around 10 kHz, where dips are more likely to occur. Thus, it is possible to improve the measurement accuracy of the frequency characteristics in the mid/high ranges.

Imagine the sound field environment of a car audio system installed in a car cabin. The distances from the installation positions of the right and left speakers to the listening position are asymmetrical due to the positional relationship between these speaker installation positions and the seating position. The propagation delay difference between the channels tends to be several tens of centimeters. When the propagation delay difference is several tens of centimeters, the frequency range in which dips may occur is 1 kHz. Accordingly, when such a large propagation delay difference occurs, it is preferred to set the cut-off frequencies of the filters to a lower frequency in accordance with the frequency range in which dips may occur due to the propagation delay difference.

However, if the cut-off frequencies are set to an extremely low frequency, it would be difficult to measure the low range, in which the signal level tends to significantly vary due to the inter-symbol interference, using a stereo measurement signal. For this reason, it is preferred to set the cut-off frequencies of the LPF 22a and HPF 22b to a frequency lower than the mid/high ranges, in which dips can occur due to inter-channel interference, and higher than the low range, in which inter-symbol interference may occur. By setting the cut-off frequencies to such a frequency, it is possible to realize both the suppression of inter-channel interference and the reduction in inter-symbol interference and thus to accurately measure the frequency characteristics of the sound field environment.

While the sound field measuring device, method, and program according to the embodiment of the present invention has been described in detail with reference to the drawings, the sound field measuring device, method, and program according to the present invention are not limited to the embodiment. Those skilled in the art would conceive of changes or modifications thereto without departing from the scope of Claims, and such changes or modifications are to be construed as falling within the technical scope of the present invention.

For example, in the sound field measuring device 1 according to the embodiment, the CPU 2 performs the functions of the function elements as shown in FIG. 2 on the basis of the processing program or application program recorded in the ROM 3 or storage unit 5 as shown in FIG. 1; however, the number of CPUs for performing the functions of the function elements need not be one. For example, dedicated processing units (e.g., multiple CPUs) for performing some functions of the function elements may be provided so that each dedicated processing unit performs at least one or more functions. Whether multiple dedicated processing units are set as described above or whether one CPU performs a sound field measuring process on the basis of a processing program or the like, by combining a mono measurement signal and a stereo measurement signal, it is possible to reduce the effect of inter-channel interference or inter-symbol interference and to measure the frequency characteristics of the sound field environment quickly and accurately without dividing the time for each channel.

REFERENCE SIGNS LIST 1 sound field measuring device
2 CPU
3 ROM
4 RAM
5 storage unit
6 external output unit
7 microphone
8 display unit
11 measurement signal generation unit
12 frequency division/combination unit
13 Fourier transform unit
14 averaging unit
21a first measurement signal generation unit
21b second measurement signal generation unit
22a LPF (low-pass filter)
22b HPF (high-pass filter)
22c addition unit (combined signal generation unit)
22d delay unit
23a maximum value detection unit
23b average value calculation unit
100 music playback function unit
101a right speaker
101b left speaker
102 portable audio system (audio system)

The invention claimed is:

1. A sound field measuring device for obtaining frequency characteristics of a sound field by collecting output sound outputted from an audio system having a pair of speakers installed at a narrow interval therein, the sound field measuring device comprising:
a low-pass filter configured to extract low-range components of a first measurement signal;
a high-pass filter configured to extract mid/high-range components of a second measurement signal different from the first measurement signal;
a combined signal generation unit configured to generate a combined signal by combining the low-range components of the first measurement signal extracted by the low-pass filter and the mid/high-range components of the second measurement signal extracted by the high-pass filter;
an external output unit configured to output the first measurement signal whose low-range components have yet to be extracted by the low-pass filter and the combined signal generated by the combined signal generation unit to the audio system so that the first measurement signal is outputted from one of the pair of speakers and the combined signal is simultaneously outputted from the other of the pair of speakers;
a microphone configured to collect the first measurement signal and the combined signal simultaneously outputted from the pair of speakers; and a Fourier transform unit configured to obtain the frequency characteristics of the sound field by Fourier transforming the signals collected by the microphone, wherein an m-sequence code is used as the first measurement signal, and an m-sequence code orthogonal to the m-sequence code serving as the first measurement signal is used as the second measurement signal, the sound field measuring device further comprising:
a maximum value detection unit configured to obtain frequency characteristics composed of maximum values by detecting a maximum value of signal levels in a predetermined first frequency range while shifting the first frequency range in steps of a shorter frequency range than the first frequency range, on the basis of the frequency characteristics obtained by the Fourier transform unit; and
an average value calculation unit configured to obtain the frequency characteristics of the sound field by calculating an average value of signal levels in a predetermined second frequency range while shifting the second frequency range in steps of a shorter frequency range than the second frequency range, on the basis of frequency characteristics composed of the maximum values detected by the maximum value detection unit.

2. The sound field measuring device according to claim 1, wherein cut-off frequencies set in the low-pass filter and the high-pass filter are set to a lower frequency than a frequency value of a dip which can occur in the frequency characteristics obtained by the Fourier transform unit when the first measurement signal whose low-range components have yet to be extracted is simultaneously outputted from the pair of speakers.

3. A sound field measuring method using a sound field measuring device, the sound field measuring device obtaining frequency characteristics of a sound field by collecting output sound outputted from an audio system having a pair of speakers installed at a narrow interval therein, the sound field measuring method comprising:
a low-range component extraction step in which a low-pass filter extracts low-range components of a first measurement signal;
a mid/high-range component extraction step in which a high-pass filter extracts mid/high-range components of a second measurement signal different from the first measurement signal;
a combined signal generation step in which a combined signal generation unit generates a combined signal by combining the low-range components of the first measurement signal extracted in the low-range component extraction step and the mid/high-range components of the second measurement signal extracted in the mid/high-range component extraction step;
an external output step in which an external output unit outputs the first measurement signal whose low-range components have yet to be extracted in the low-range component extraction step and the combined signal generated in the combined signal generation step to the audio system so that the first measurement signal is outputted from one of the pair of speakers and the combined signal is simultaneously outputted from the other of the pair of speakers;
a sound collection step in which a microphone collects the first measurement signal and the combined signal simultaneously outputted from the pair of speakers; and a Fourier transform step in which a Fourier transform unit obtains the frequency characteristics of the sound field by Fourier transforming the signals collected in the sound collection step, wherein an m-sequence code is used as the first measurement signal, and an m-sequence code orthogonal to the m-sequence code serving as the first measurement signal is used as the second measurement signal, the sound field measuring method further comprising:

a maximum value detection step in which a maximum value detection unit obtains frequency characteristics composed of maximum values by detecting a maximum value of signal levels in a predetermined first frequency range while shifting the first frequency range in steps of a shorter frequency range than the first frequency range, on the basis of the frequency characteristics obtained in the Fourier transform step; and an average value calculation step in which an average value calculation unit obtains the frequency characteristics of the sound field by calculating an average value of signal levels in a predetermined second frequency range while shifting the second frequency range in steps of a shorter frequency range than the second frequency range, on the basis of frequency characteristics composed of the maximum values obtained in the maximum value detection step.

4. The sound field measuring method according to claim 3, wherein cut-off frequencies set in the low-range component extraction step and the mid/high-range component extraction step are set to a lower frequency than a frequency value of a dip which can occur in the frequency characteristics obtained in the Fourier transform step when the first measurement signal whose low-range components have yet to be extracted is simultaneously outputted from the pair of speakers.

5. A non-transitory computer-readable recording medium storing a sound field measuring program for causing a computer of a sound field measuring device for obtaining frequency characteristics of a sound field by collecting output sound outputted from an audio system having a pair of speakers installed at a narrow interval therein to perform:

a low-pass filter function of extracting low-range components of a first measurement signal;

a high-pass filter function of extracting mid/high-range components of a second measurement signal different from the first measurement signal;

a combined signal generation function of generating a combined signal by combining the low-range components of the first measurement signal extracted by the low-pass filter function and the mid/high-range components of the second measurement signal extracted by the high-pass filter function;

an external output function of outputting the first measurement signal whose low-range components have yet to be extracted by the low-pass filter function and the combined signal generated by the combined signal generation function to the audio system so that the first measurement signal is outputted from one of the pair of speakers and the combined signal is simultaneously outputted from the other of the pair of speakers;

a sound collection function of collecting the first measurement signal and the combined signal simultaneously outputted from the pair of speakers using a microphone; and a Fourier transform function of obtaining the frequency characteristics of the sound field by Fourier transforming the signals collected by the sound collection function, wherein an m-sequence code is used as the first measurement signal, and an m-sequence code orthogonal to the m-sequence code serving as the first measurement signal is used as the second measurement signal, the sound field measuring program causing the computer to further perform:

a maximum value detection function of obtaining frequency characteristics composed of maximum values by detecting a maximum value of signal levels in a predetermined first frequency range while shifting the first frequency range in steps of a shorter frequency range than the first frequency range, on the basis of the frequency characteristics obtained by the Fourier transform function; and an average value calculation function of obtaining the frequency characteristics of the sound field by calculating an average value of signal levels in a predetermined second frequency range while shifting the second frequency range in steps of a shorter frequency range than the second frequency range, on the basis of frequency characteristics composed of the maximum values detected by the maximum value detection function.

6. The non-transitory computer-readable recording medium according to claim 5, wherein cut-off frequencies set in the low-pass filter function and the high-pass filter function are set to a lower frequency than a frequency value of a dip which can occur in the frequency characteristics obtained by the Fourier transform function when the first measurement signal whose low-range components have yet to be extracted is simultaneously outputted from the pair of speakers.

* * * * *